United States Patent [19]
Unno et al.

[11] Patent Number: 5,473,532
[45] Date of Patent: Dec. 5, 1995

[54] INTELLIGENT MACHINING SYSTEM

[75] Inventors: Kunihiko Unno, Kariya; Yukinori Kakazu, 52-1, Bunkyo-dai, Ebetsu-shi, Hokkaido; Takao Yoneda; Moriaki Sakakura, both of Nagoya; Masashi Yamanaka, Kariya; Shiho Hattori, Nagoya, all of Japan

[73] Assignees: Toyoda Koki Kabushiki Kaisha, Kariya; Yukinori Kakazu, Ebetsu, both of Japan

[21] Appl. No.: 731,472

[22] Filed: Jul. 17, 1991

[30] Foreign Application Priority Data

| Jul. 17, 1990 | [JP] | Japan | 2-190322 |
| Sep. 27, 1990 | [JP] | Japan | 2-259226 |
| Sep. 29, 1990 | [JP] | Japan | 2-262780 |

[51] Int. Cl.$^6$ ............................................. G06F 17/00
[52] U.S. Cl. ................. 364/152; 364/148; 364/474.11; 395/89; 395/904; 395/21
[58] Field of Search ............................... 395/23, 24, 25, 395/26, 27, 10, 11, 9, 89, 21, 903, 904; 364/152, 148, 149, 474.11, 474.17, 474.16

[56] References Cited

U.S. PATENT DOCUMENTS

| 3,873,816 | 3/1975 | Takeyama et al. . | |
| 5,111,531 | 5/1992 | Grayson et al. | 395/23 |
| 5,119,468 | 6/1992 | Owens | 364/151 |
| 5,121,467 | 6/1992 | Skeirik | 395/23 |

FOREIGN PATENT DOCUMENTS

| 0359378 | 3/1990 | European Pat. Off. . |
| 0436040 | 7/1991 | European Pat. Off. . |
| 295543 | 4/1990 | Japan . |

OTHER PUBLICATIONS

Sobajic, Dejan J. et al; "Robust Control of Non–Linear Systems Using Pattern Recognition"; 1989 Dec. 31; pp. 315–320.

Patent Abstracts of Japan, vol. 14, No. 372 (P–1061), Aug. 10, 1990, JP–A–21 38 679, May 28, 1990.
Patent Abstracts of Japan, vol. 14, No. 283 (P–1063, Jun. 19, 1990, JP–A–20 83 656, Mar. 23, 1990.
Patent Abstracts of Japan, vol. 15, No. 190 (M–1113), May 16, 1991, JP–A–30 49 845, Mar. 4, 1991.
First Workshop Of The Intelligent Manufacturing Systems Seminars On Learning In IMS Mar. 6–8, 1991, pp. 101–119, D. Barschdorff, et al., "Neural Networks—Their Applications and Perspectives in Intelligent Machining".
IEEE International Conference On Robotics and Automation Apr. 9–11, 1991, pp. 1567–1572, G. Sang Choi, et al., "Adaptive Optimal Control of Machining Process Using Neural Networks".
IEEE Transaction on Systems, Man, and Cybernetics, vol. 19, No. 2, Mar./Apr. 1989, pp. 299–314, S. S. Rangwala, et al., "Learning and Optimization of Machining Operations Using Computing Abilities of Neutral Networks".

Primary Examiner—Roy N. Envall, Jr.
Assistant Examiner—Brian C. Oakes
Attorney, Agent, or Firm—Oblon, Spivak, McClelland, Maier & Neustadt

[57] ABSTRACT

An intelligent machining system employs a neural network for calculating machining conditions on the basis of attribute data or a workpiece and a grinding machine. The system comprises a reference machining condition calculating unit, a neural network which receives the attribute data and provides corrections, and a correcting unit for correcting the reference machining conditions by using the corrections. Corrections which cannot be determined by means of empirical expressions or theoretical expressions are determined appropriately by the neural network previously learned. The system determines corrections for the machining conditions on the basis of machining errors decided by a neural network. The system also detects time-series machining phenomena by sensors, processes the output detection signals of the sensors by a neural network to obtain machining circumstance data. The feed rate of the tool is controlled by a fuzzy inference on the basis of the machining circumstance data.

20 Claims, 26 Drawing Sheets

INTELLIGENT MACHINING SYSTEM

BACKGROUND OF THE INVENTION

1. Field of the Invention

The present invention relates to an intelligent machining system for machining a workpiece using a numerically controlled machine tool.

2. Description of the Prior Art

There has been a known automatic control system as shown in FIG. 16 for automatically determining machining conditions for a numerically controlled grinding machine, such as the rotating speed of a workpiece and the feed speed of the grinding wheel, on the basis of input conditions and fixed conditions to achieve desired machining results. For example, the rotating speed of the workpiece is determined automatically, as shown in FIG. 17, through the arithmetic processing of the input conditions by using theoretical formulas, empirical formulas and predetermined internal constants.

The input conditions, the fixed conditions and the machining conditions will inclusively be designated as static machining conditions.

The input conditions include the data of the workpiece including the materials, dimensions. allowances, surface roughness, dimensional accuracy and the like of the workpiece, and the data of the grinding wheel including the type and the like of the grinding wheel.

The fixed conditions are those relating to the numerically controlled grinding machine including the surface speed of the grinding wheel and the like.

The machining conditions include machining sequence, rotating speed of the workpiece, feed speed, machining allowances and dressing conditions.

The machining results include machining time, surface roughness, dimensional accuracy, roundness, burning, grinding crack, chatter and the like.

Variable conditions among the static machining conditions can be corrected after the automatic determination of the static machining conditions. The conditions thus corrected after automatic determination will be designated as corrected machining conditions. The static machining conditions and the corrected machining conditions will inclusively be designated as machining conditions.

Although many studies have been made to optimize machining conditions for grinding operation, machining conditions have not fully been elucidated.

Data provided by the automatic determination in the existing status of art is recognized merely as reference data, and the appropriate adjustment of the machining conditions for individual machining process requires the skill of the operator including intuition and experiences.

It is known empirically that the automatically determined machining conditions are not necessarily optimum conditions meeting the input conditions and fixed conditions. In practical machining operation, the automatically determined machining conditions are corrected on the basis of the empirical knowledge and intuition of the operator or the measurement of the workpiece machined according to the automatically determined machining conditions.

Since the correction of one of the machining conditions affects those of other machining conditions, the correction of the automatically determined machining conditions by the operator is considerably difficult.

Since the selection of machining conditions to be corrected and the determination of corrections for the machining conditions on the basis of machining errors determined by measuring the workpiece machined according to the predetermined machining conditions are dependent on the empirical skill and intuition of the operator, the correction made by the operator is not necessarily appropriate. Therefore, the machining of the workpiece according to corrected machining conditions, measurement of the workpiece and the recorrection of the corrected machining conditions must be repeated several times.

The current automatic machining condition determining method provides constant machining conditions in cases where provided that the input conditions and the fixed conditions are not changed; that is, the automatic machining condition determining method is of an open loop system which does not take the correction by the operator into consideration in the future automatic machining condition determination.

For example, even if the machining conditions are corrected properly by the operator, the rule for calculating the machining conditions is not changed for the future calculation of machining conditions. Accordingly, the operator is required to repeat the correcting operation for the determination of the same machining conditions.

The determination of the corrected machining conditions is not assisted by any numerical controller, but requires the technical skill of the operator including intuition and experiences.

During the grinding operation, machining circumstances including the abrasion of the grinding wheel, the thermal deformation of the parts of the grinding machine and the qualitative condition of the workpiece vary from time to time and affect the machining results significantly.

Accordingly, even if the static machining conditions or the corrected machining conditions are optimum machining conditions at the start of the machining operation, they are not necessarily optimum machining conditions throughout the machining operation because machining circumstances vary with time.

SUMMARY OF THE INVENTION

Accordingly, it is a first object of the present invention to provide an intelligent machining system capable of learning corrected machining conditions so as to determine optimum machining conditions without requiring the assistance of a skilled operator.

A second object of the present invention is to provide an intelligent machining system capable of automatically determining corrected machining conditions meeting the request of the operator for the change of the machining conditions based oil the evaluation of machining results.

A third object of the present invention is to provide an intelligent machining system capable of preventing the variation of machining results attributable to the variation of machining circumstances.

A fourth object of the present invention is to provide an intelligent machining system capable of reflecting the empirical casual relation between machining errors and machining conditions on the determination of machining conditions.

A fifth object of the present invention is to provide an intelligent machining system capable of determining appropriate machining conditions by reflecting mutual actions between corrections for a plurality of machining conditions on the determination of the machining conditions.

A sixth object of the present invention is to provide an intelligent-machining system capable of changing the machining conditions in a real-time control mode according to the variation of machining circumstances so that optimum machined results are achieved in machining a workpiece.

It is a feature of the present invention to use a neural network for determining machining conditions on the basis of input and fixed conditions. The neural network learns the actual causal relation between input and fixed conditions and machining conditions, and hence quantities which cannot be determined by calculation using empirical formulas and theoretical formulas can be determined by the effect of empirical learning of the neural network. The input conditions and the fixed conditions include the material of a workpiece, finishing accuracy, the type of the grinding wheel and the operating mode of the grinding machine, which are prerequisites for determining machining conditions. Since the input conditions and fixed conditions represent the attributes of the workpiece and the grinding machine, the input conditions and fixed conditions will be designated inclusively as attribute data, and data representing machining conditions will be designated as machining condition data.

In a first aspect of the present invention, an intelligent machining system comprises reference value calculating means for calculating reference values of machining condition data on the basis of attribute data, a neural network that inputs the attribute data and provides corrections for the reference values, and correcting means for correcting the reference values of the machining condition data by using the corrections provided by the neural network.

Since the neural network determines the corrections which cannot be determined by using empirical formulas or theoretical formulas, the machining conditions can properly be corrected according to empirical data. Practically, the neural network is learned by using appropriate machining condition data corresponding to the attribute data as teaching data. The appropriate machining condition data is determined on the basis of the experiences and intuition of the operator and on corrected machining condition data obtained by correcting the machining conditions with reference to the results of evaluation of machined results (machining errors) obtained by measuring the workpiece machined according to the machining conditions.

In a second aspect of the present invention, an intelligent machining system comprises a neural network which inputs attribute data and outputs coefficients for empirical and theoretical formulas (hereinafter referred to inclusively as "calculating expressions"), and arithmetic means for calculating machining conditions by using the coefficients provided by the neural network and the calculating expressions.

This intelligent machining system produces optimum calculating expressions empirically according to attribute data. Accordingly, the empirical causal relation between attribute data and machining data is reflected on the machining condition data determined by the intelligent machining system, which is different from machining data determined by using calculating expressions which are fixed regardless of attribute data.

In a third aspect of the present invention, an intelligent machining system changes the neural network of the intelligent machining system in the first aspect of the present invention between a feedback type which feeds back the output to the intermediate layer, and a nonfeedback type which does not feed back the output to the intermediate layer. The intelligent machining system in the third aspect of the present invention comprises first operating means for operating the neural network in a nonfeedback type, and a second operating means for operating the neural network in a feedback type. The neural network of such a construction enables the determination of corrections taking into consideration the mutual actions between the corrections for the machining conditions.

In a fourth aspect of the present invention, an intelligent machining system comprises a neural network which inputs deviations of machined results determined by measuring a workpiece machined according to machining condition data from desired values, i.e., machining errors, and provides corrections for the machining condition data, and correcting means for correcting the machining condition data by using the corrections provided by the neural network.

The neural network is taught by using accumulated appropriate machining condition data as teaching data. Thus, the neural network enables the appropriate correction of machining condition data on the basis of the empirical causal relation between the machining errors and the corrections for the machining condition data.

In a fifth aspect of the present invention, an intelligent machining system comprises, in an organic combination, the first, second or third intelligent machining system and the fourth intelligent machining system. Therefore, a neural network is able to determine machining condition data on the basis of attribute data and to correct the machining condition data on the basis of machined results determined by measuring a workpiece machined according to the machining condition data. Consequently, the relation between the machined results and the machining condition data is reflected on the correction of the machining condition data, so that further appropriate corrected machining condition data can be determined. The corrected machining condition data corrected on the basis of the machined results can be used as teaching data for the attribute data for teaching the neural network of the former intelligent machining system. In such a case, an appropriate machining condition data can be determined only by the neural network of the former intelligent machining system.

In a sixth aspect of the present invention, an intelligent machining system comprises a neural network for determining machining circumstance data representing machining circumstances on the basis of machining phenomena variable with time, such as sparks, sound and forces acting on the workpiece, and control means for controlling the feed rate in a real-time control mode on the basis of machining circumstance data outputted from the neural network. The neural network is taught by using machining condition data representing the time-variable machining phenomena as teaching data. Accordingly, the machining circumstances can be recognized from the machining phenomena by using the neural network. Thus, the machining circumstance data enables adaptive control of the feed rate, in which the feed rate of the tool is regulated according to the machining circumstance data so that the workpiece can be machined in a desired quality.

In a seventh aspect of the present invention, the feed rate control means is fuzzy inference means.

The fuzzy inference means inputs the machining circumstance data and regulates the feed rate of the tool in a stepless mode, so that machining conditions are varied smoothly according to the machining circumstances.

In an eighth aspect of the present invention, an intelligent machining system comprises, in combination, the intelligent machining system in the seventh aspect and the intelligent machining system in the first, second, third, fourth or fifth aspect.

This intelligent machining system determines and corrects machining condition data appropriately on the basis of rule got by experience, changes the machining condition data including feed rate in a real-time mode during actual machining operation to achieve adaptive control. Thus, the intelligent machining system is of very high performance.

DESCRIPTION OF THE PREFERRED EMBODIMENTS

The present invention will be described hereinafter in connection with the preferred embodiments thereof.

First Embodiment

1. Numerically Controlled Grinding Machine

Figure 1:
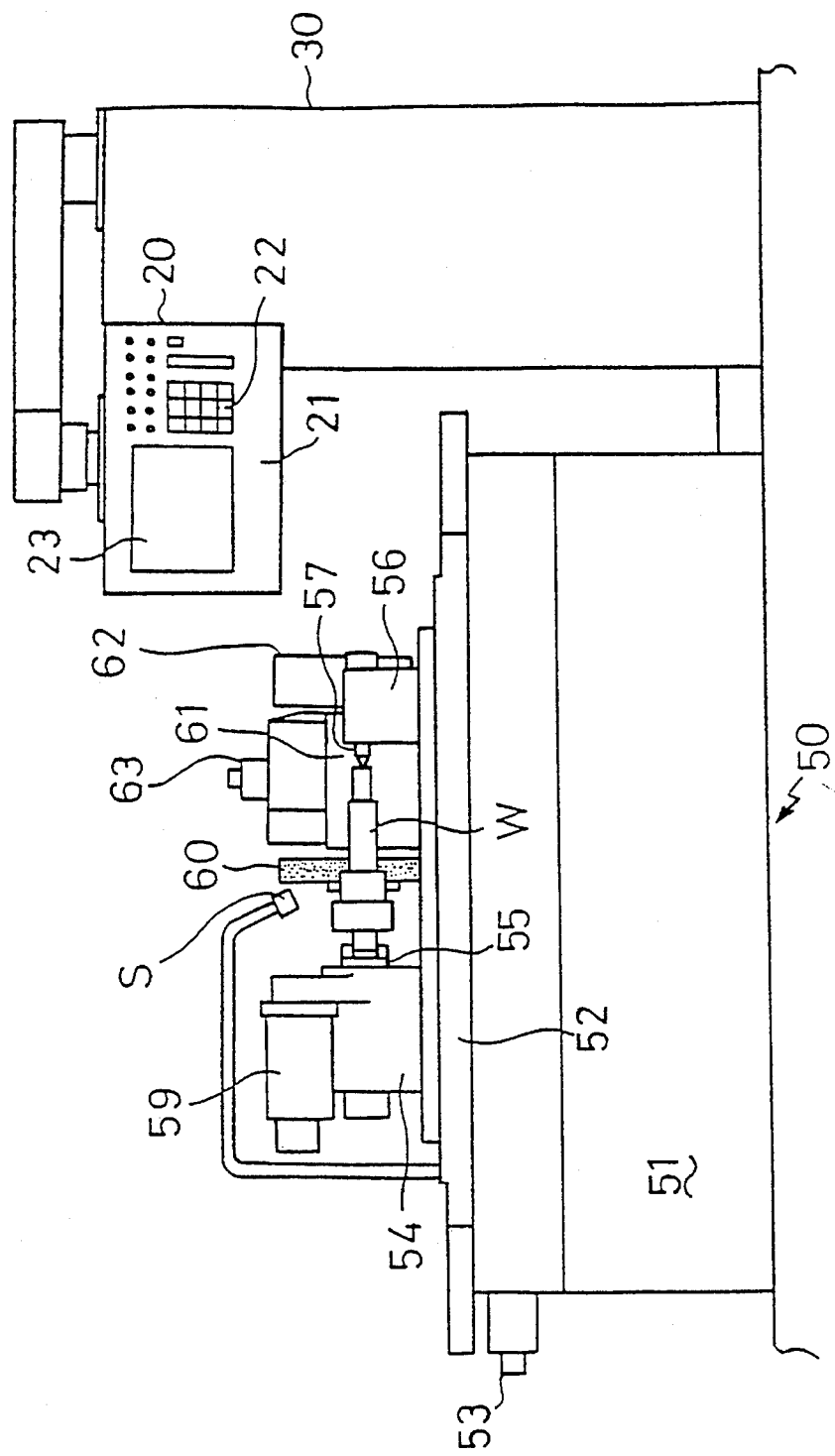
FIG. 1 is a schematic front view of a numerically controlled grinding machine incorporating an intelligent machining system in a first embodiment according to the present invention.

FIG. 1 shows the general mechanical construction of a numerically controlled grinding machine 50 (hereinafter referred to simply as "grinding machine") incorporating an intelligent machining system in a first embodiment according to the present invention. The grinding machine 50 has a slide table 52 mounted on a bed 51 and driven by a table feed motor 53 for longitudinal sliding movement. Mounted on the slide table 52 are a spindlestock 54 provided with a main spindle 55, and a tailstock 56 provided with a tailstock spindle 57. A workpiece W held between the main spindle 55 and the tailstock spindle 57 is driven for rotation by the main spindle 55, which in turn is driven for rotation by a spindle driving motor 59 mounted on the spindlestock 54.

A grinding wheel 60 for grinding the workpiece is supported for rotation on a wheel spindlestock 61 and is driven for rotation by a wheel driving motor 62. The wheel spindlestock 61 is driven for movement in directions perpendicular to the paper by a wheel spindlestock driving motor 63.

The operation of the table feed motor 53, the spindle driving motor 59, wheel driving motor 62 and the wheel spindlestock driving motor 63 is controlled by a numerical control unit 30.

2. Numerical Control Unit

Figure 2:
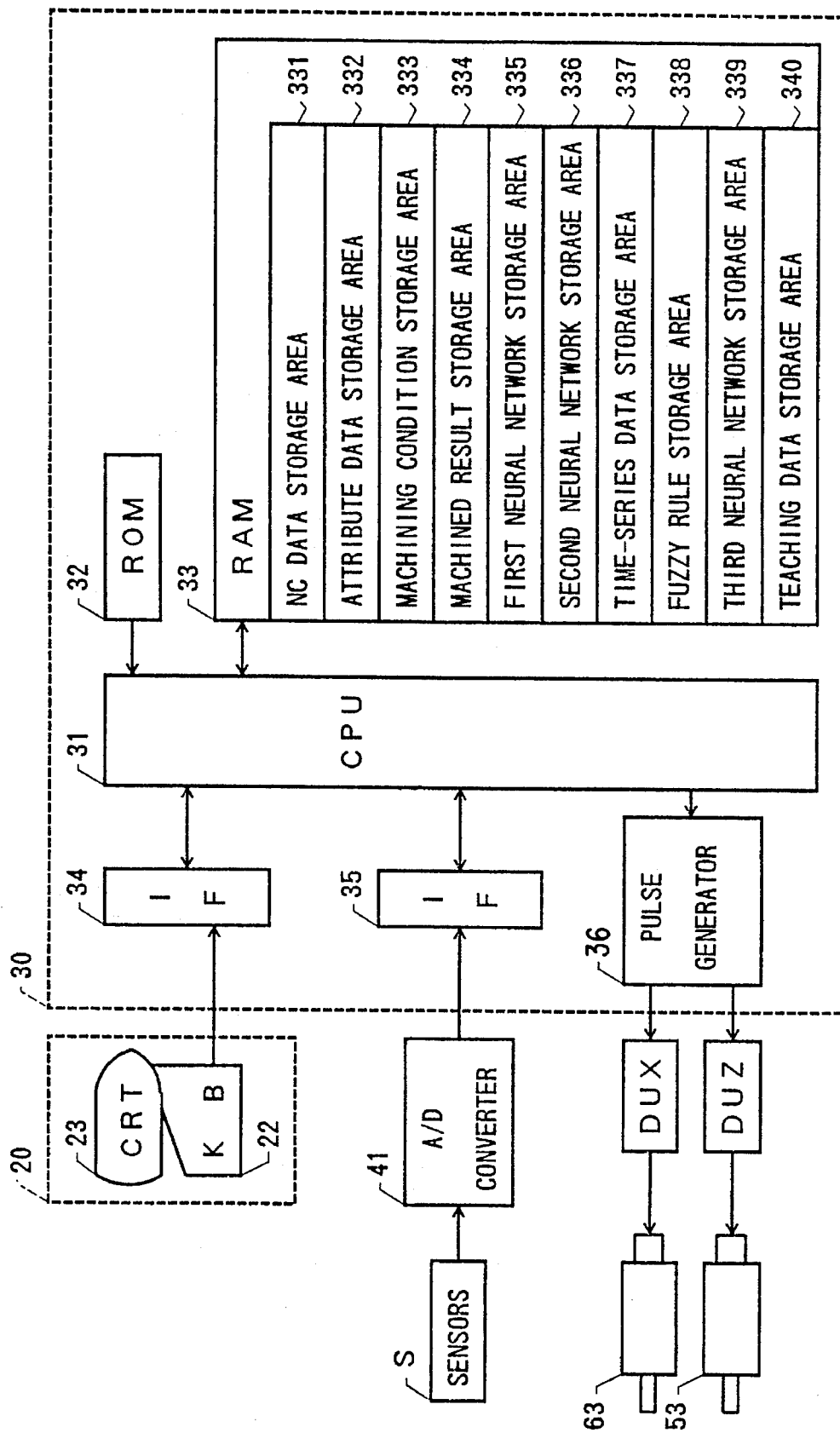
FIG. 2 is a block diagram showing the electrical configuration of a numerical control unit and an operator's console included in the numerically controlled grinding machine of FIG. 1.

As shown in FIG. 2, the numerical control unit 30 comprises, as principal components, a CPU 31, a ROM 32 storing control programs, a RAM 33 for storing input data, IFs (interfaces) 34 and 35, and a pulse generating circuit 36.

The pulse generating circuit 36 is connected to the CPU 31 of the numerical control unit 30. The pulse generating circuit 36 applies command pulses to driving circuits DUZ and DUX respectively for driving the table driving motor 53 and the wheel spindlestock driving motor 63. An operator's console 20 is connected through the IF 34 to the CPU 31. A keyboard 22 for entering data and a CRT display 23 for displaying data are installed on the operation panel 21 of the operator's console 20.

The numerical control unit 30 receives the output signals of sensors S for detecting instantaneous machining phenomena, such as sparks, sound and forces, through an A/D converter 41 and the IF 35.

The RAM 33 has a NC data storage area 331 for storing NC programs, an attribute data storage area 332 serving as attribute data storing means for storing data representing the attributes of the workpiece, such as material, dimensions, machining allowances, surface roughness and dimensional accuracy, and data representing the attributes of the grinding machine, such as the surface speed of the grinding wheel, a machining condition storage area 333 for storing machining conditions including workpiece rotating speed and wheel feed speed, a machining result storage area 334 for storing machined results including machining time, surface roughness, dimensional accuracy and roundness, a first neural network storage area 335 for storing combination weight factors and operation programs for a first neural network, a second neural network storage area 336 for storing combination weight factors and operation programs for a second neural network, a time series data storage area 337 for storing time series data, and a fuzzy rule storage area 338 for storing fuzzy rules.

3. Functional Constitution of the Intelligent Machining System

Figure 15:
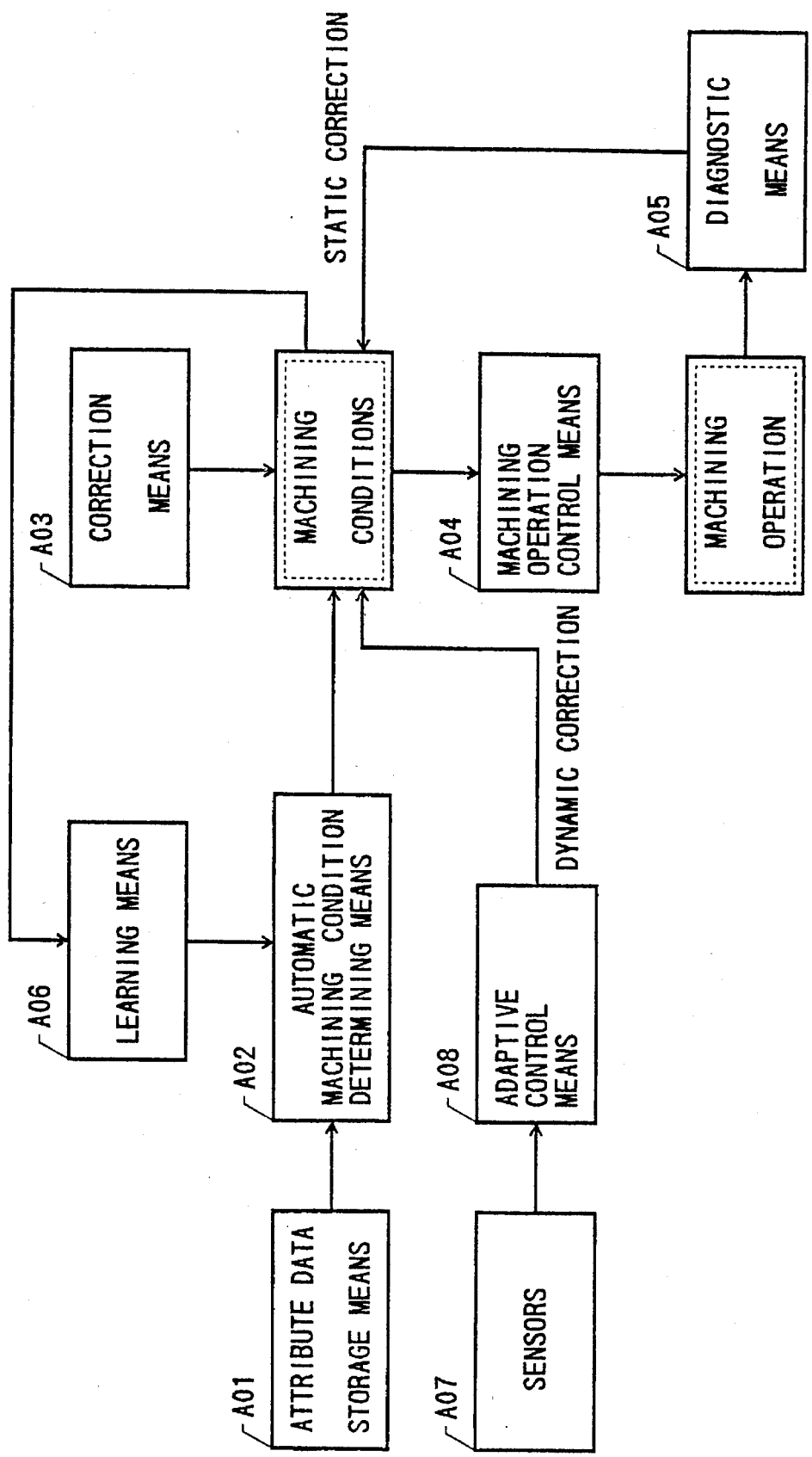
FIG. 15 is a block diagram of the overall functions of the intelligent machining system in the first embodiment.
Figure 16:
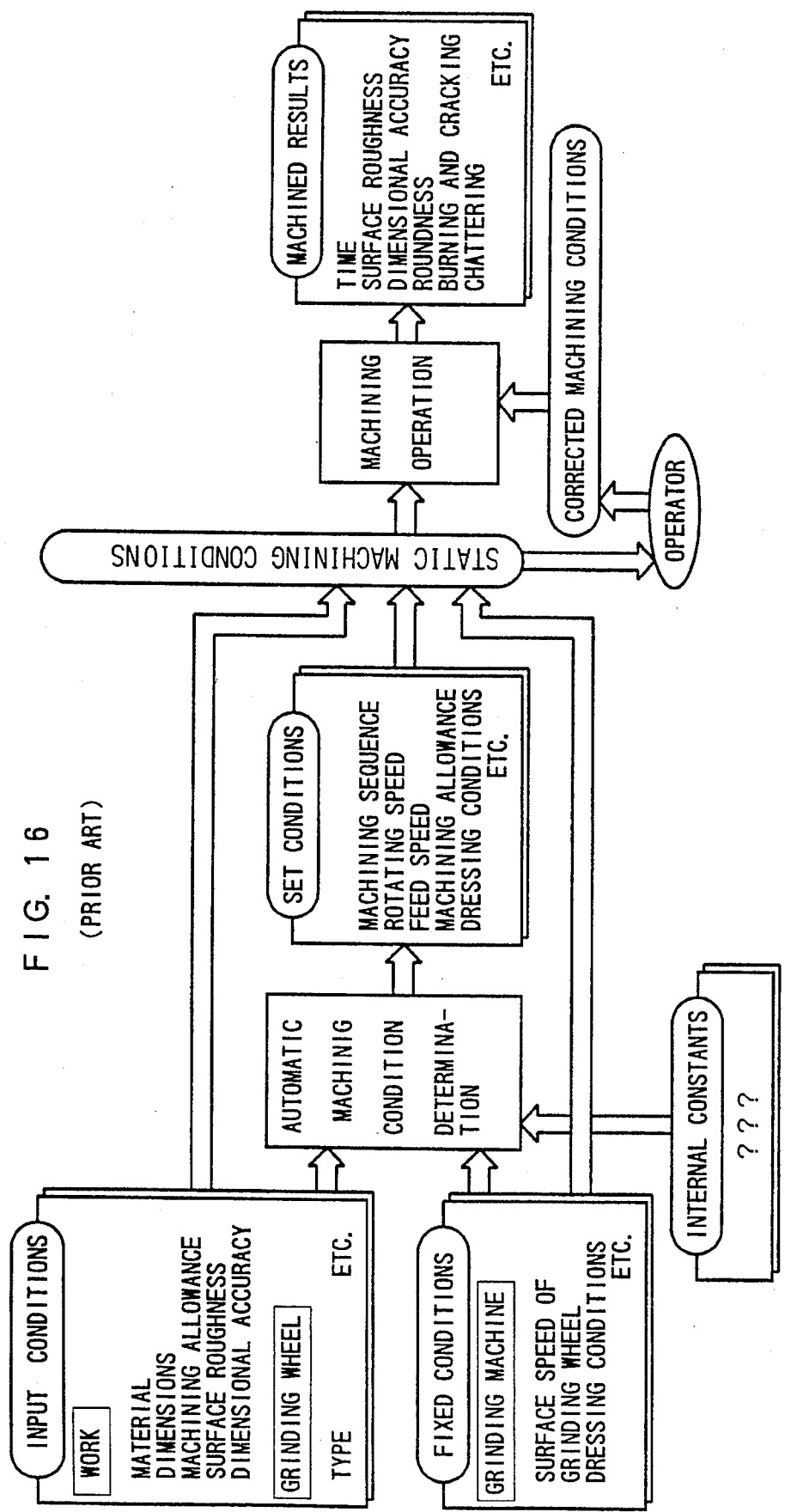
FIG. 16 is a block diagram of assistance in explaining a procedure of determining machining conditions in the conventional grinding process.
Figure 17:
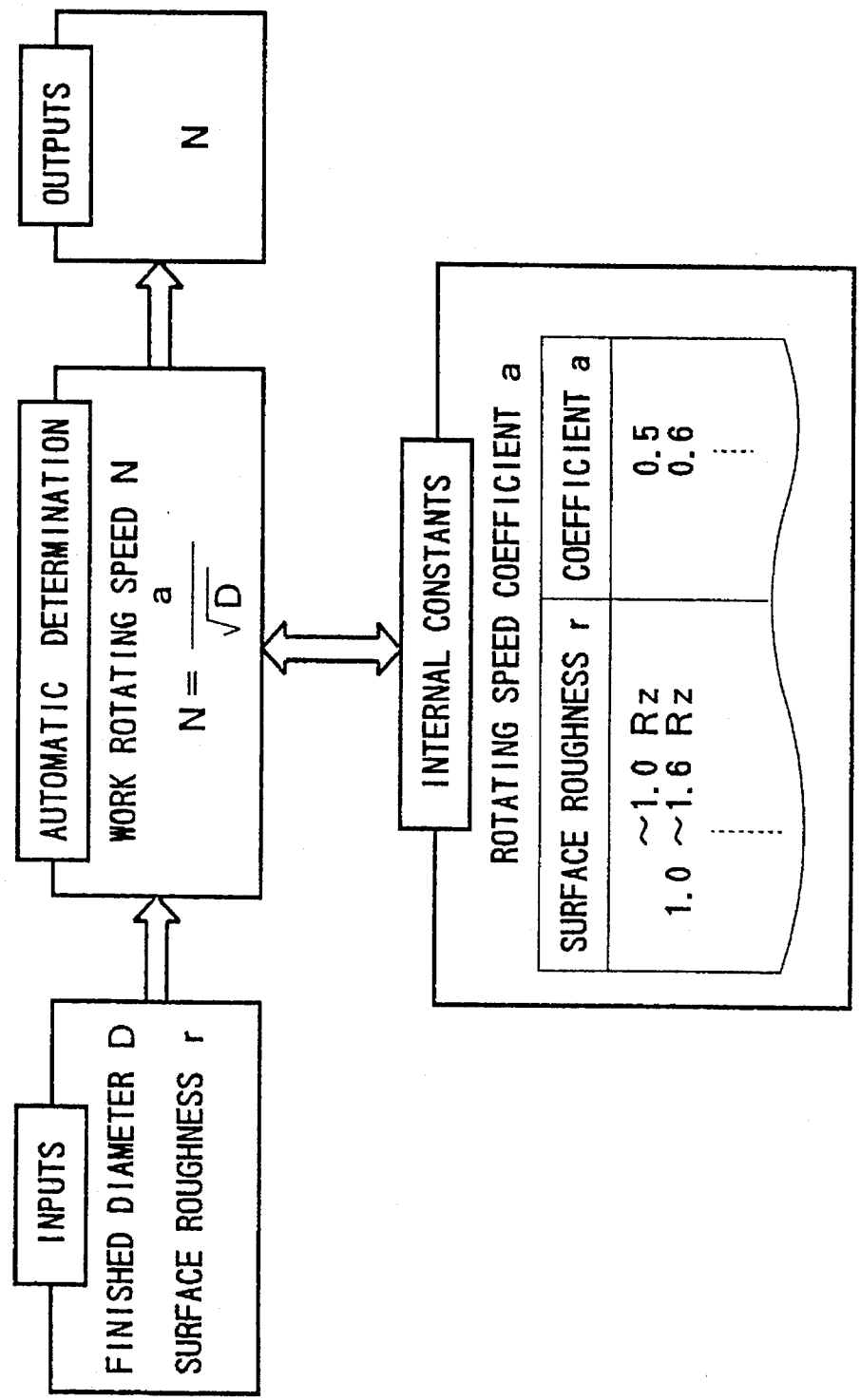
FIG. 17 is a block diagram of assistance in explaining a conventional automatic machining condition determining procedure.

Referring to FIG. 15, an attribute data storage means A01 stores input condition data of the workpiece including material, surface roughness and dimensional accuracy, input condition data of the grinding wheel including the type of the grinding wheel, fixed condition data of the grinding machine, i.e., attribute data, including the rotating speed of the grinding wheel and the frequency of dressing.

An automatic machining condition determining means A02 includes the first neural network, and determines optimum machining conditions on the basis of the attribute data stored in the attribute data storage means A01. If the machining conditions thus automatically determined by the automatic machining condition determining means A02 are not satisfactory, the operator corrects the machining conditions by means of correcting means A03.

Machining operation control means A04 controls the machining operation of the grinding machine on the basis of the automatically determined machining conditions or the corrected machining conditions corrected by means of the correcting means A03. A diagnostic means A05 including the second neural network diagnoses the machined results of the workpiece. If the results of diagnosis require the correction of the machining conditions, the machining conditions are corrected on the basis of the output of the second neural network, which receives machining errors and calculates corrections.

After the machining conditions have been corrected by the correcting means A03 and/or the diagnostic means A05, learning means A06 is enabled and teaching data is accumulated in the learning means A06 on the basis of data used for correcting the machining conditions. The weight factors of the first neural network of the automatic machining condition determining means A02 and/or the weight factors of the second neural network of the diagnostic means A05 is corrected after sufficient teaching data has been accumulated, so that the corrected machining conditions are determined for the same input data as that initially stored in the attribute data storage means A01.

Machining circumstances are detected by sensing means A07 during the machining operation, and adaptive control means A08 controls the feed of the feed shaft properly according to the outputs of the sensing means A07. The adaptive control means A08 includes a third neural network. Time-series data provided by the sensing means A07 is applied to the third neural network. The third neural network provides outputs representing the machining circumstances. The feed speed of the tool is controlled dynamically in a real-time mode on the basis of the machining circumstance data provided by the third neural network.

4. Automatic Determination of Machining Conditions

Figure 3:
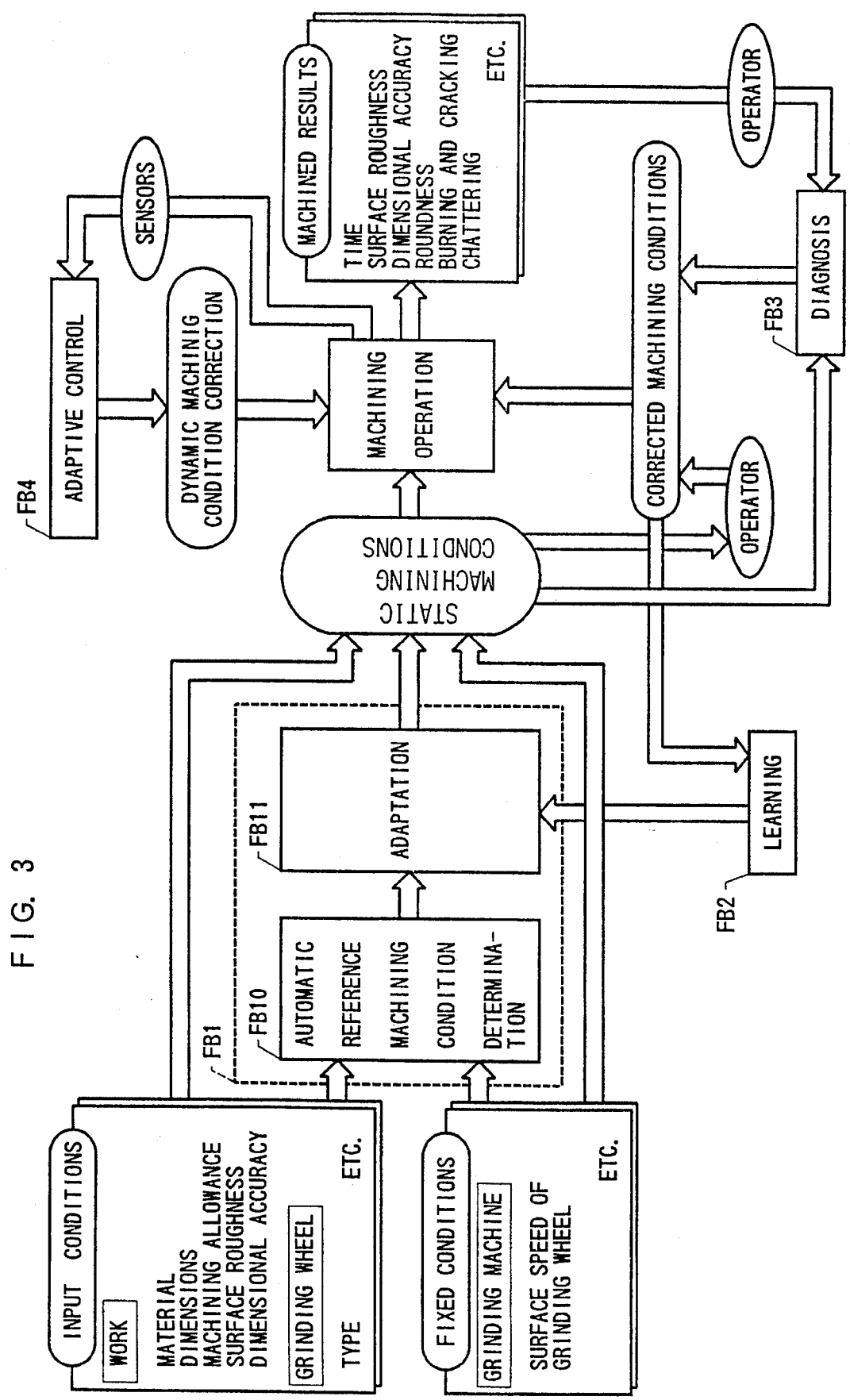
FIG. 3 is a block diagram of the functions of the intelligent machining system in the first embodiment.
Figure 4:
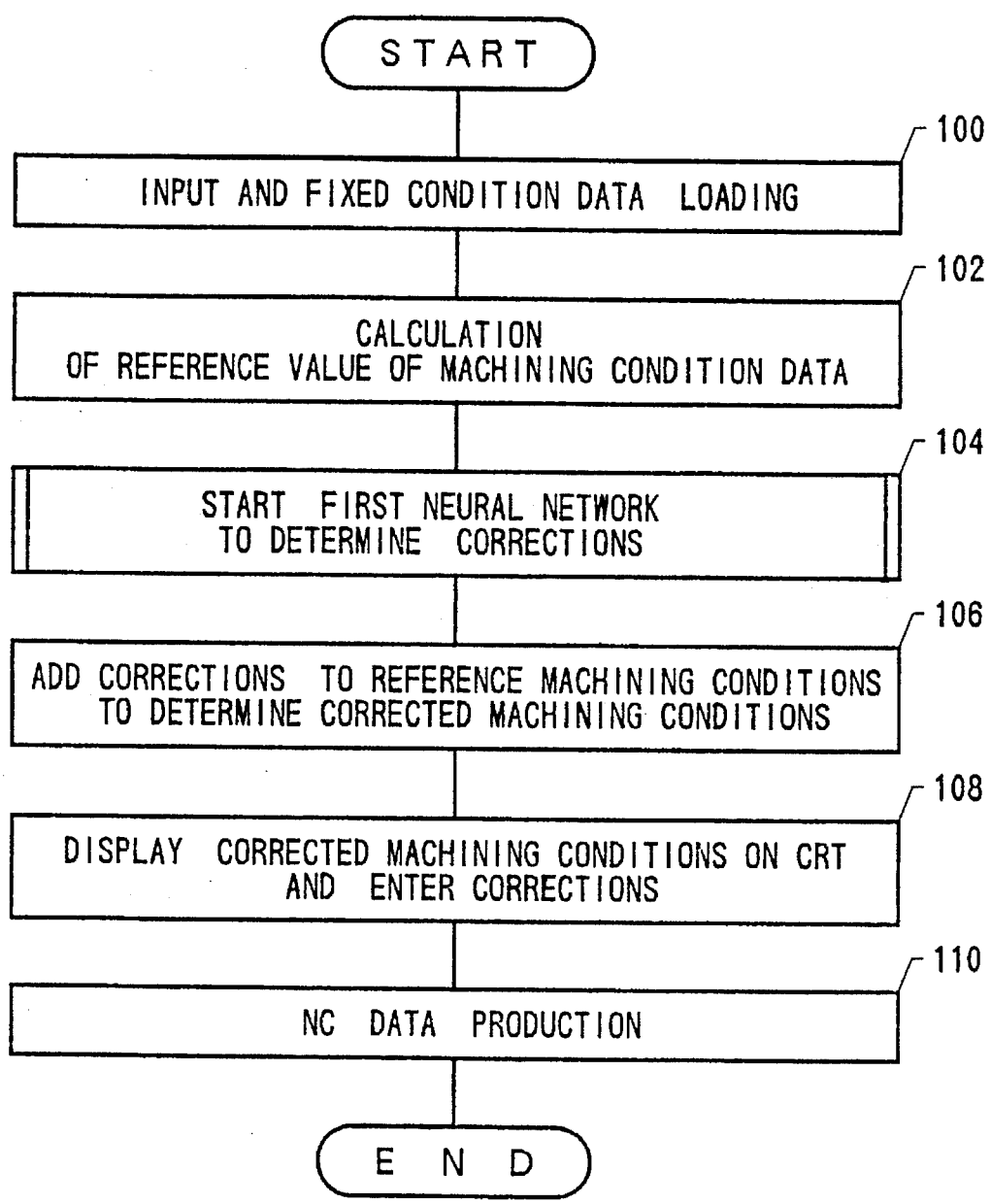
FIG. 4 is a flow chart of a machining condition data calculating procedure to be executed by a CPU included in the intelligent machining system in the first embodiment.

The operation of the intelligent machining system thus constructed will be described hereinafter with reference to FIG. 3 showing operating functions in a block diagram, and FIG. 4 showing a procedure to be executed by the CPU 31 in a flow chart.

Input data including the material and dimensions of the workpiece, and data of fixed conditions concerning the grinding machine are stored beforehand in the attribute data storage area 332 of the RAM 33.

Referring to FIG. 3, an automatic machining condition determining block FB1 comprises an automatic reference machining condition determining block FB10 which automatically determines reference machining conditions by using predetermined functional formulas and empirical formulas, and a condition adapting block FB11 which corrects automatically machining conditions determined by the automatic reference machining condition determining block FB10 by using a neural network to determine optimum machining conditions.

a. Determination of Reference Values of Machining Conditions

FIG. 4 shows the operation of the CPU 31 for realizing the functions of the automatic machining condition determining block FB1. In step 100, the attribute data (hereinafter referred to as "input and fixed conditions") entered by operating the keyboard 22 are stored in the attribute data storage area 332.

The input conditions includes material $D_1$, dimension $D_2$, total machining allowance $D_3$, surface roughness $D_4$, dimensional accuracy $D_5$, grinding wheel type $D_6$, and the fixed condition is a grinding wheel surface speed $D_7$. Condition $D_8$ is intended to generically refer to any other input condition that may be desired.

In step 102, the reference values $V_1$ to $V_{11}$ representing reference or standard machining conditions are calculated.

The machining conditions are rotating speed $K_1$ for rough machining, rotating speed $K_2$ for fine grinding, rotating speed $K_3$ for finish grinding, rough grinding starting diameter $K_4$, fine grinding starting diameter $K_5$, finish grinding starting diameter $K_6$, feed speed $K_7$ for rough grinding, feed speed $K_8$ for fine grinding, feed speed $K_9$ for finish grinding, after-rough-grinding feed stop time $K_{10}$ and after-fine-grinding feed stop time $K_{11}$.

The reference values are calculated in the following manner. As regards to the rotating speed for each grinding mode, the surface speed of the workpiece is defined beforehand as a function of required surface roughness of the workpiece for each surface speed of the grinding wheel. Surface speed of the workpiece is calculated on the basis of a specified surface roughness of the workpiece, and then rotating speed for the workpiece is calculated on the basis of the calculated surface speed and the diameter of the workpiece.

As regards to the feed speed for each grinding mode, infeed amount of the grinding wheel for one full turn of the workpiece is defined beforehand as a function of dimensional tolerance. The infeed amount is calculated on the basis of a specified dimensional tolerance for the grinding mode, and then wheel feed speed is calculated on the basis of the calculated infeed amount and the rotating speed.

As regards grinding starting diameter for each grinding mode, a standard feed amount is determined beforehand for each grinding mode. Grinding starting diameter is calculated on the basis of the relation between the standard feed amount and a specified finished diameter.

As regards the feed stop time, the accumulated rotation number of the workpiece to stop the feed of the grinding wheel is determined according to whether or not sizing grinding is directed or whether or not the grinding process is divided. The rotation number of the workpiece to stop the feed of the grinding wheel is determined on the basis of the fixed conditions, and then feed stop time is calculated by using the rotation number.

b. Calculation of Correction Values by Neural Networks

Referring to FIG. 4, the first neural network is actuated, and then input and fixed conditions $D_1$ to $D_7$ are entered in step 104 to calculate corrections $\delta_1$ to $\delta_{11}$ for the machining conditions $K_1$ to $K_{11}$.

Figure 5:
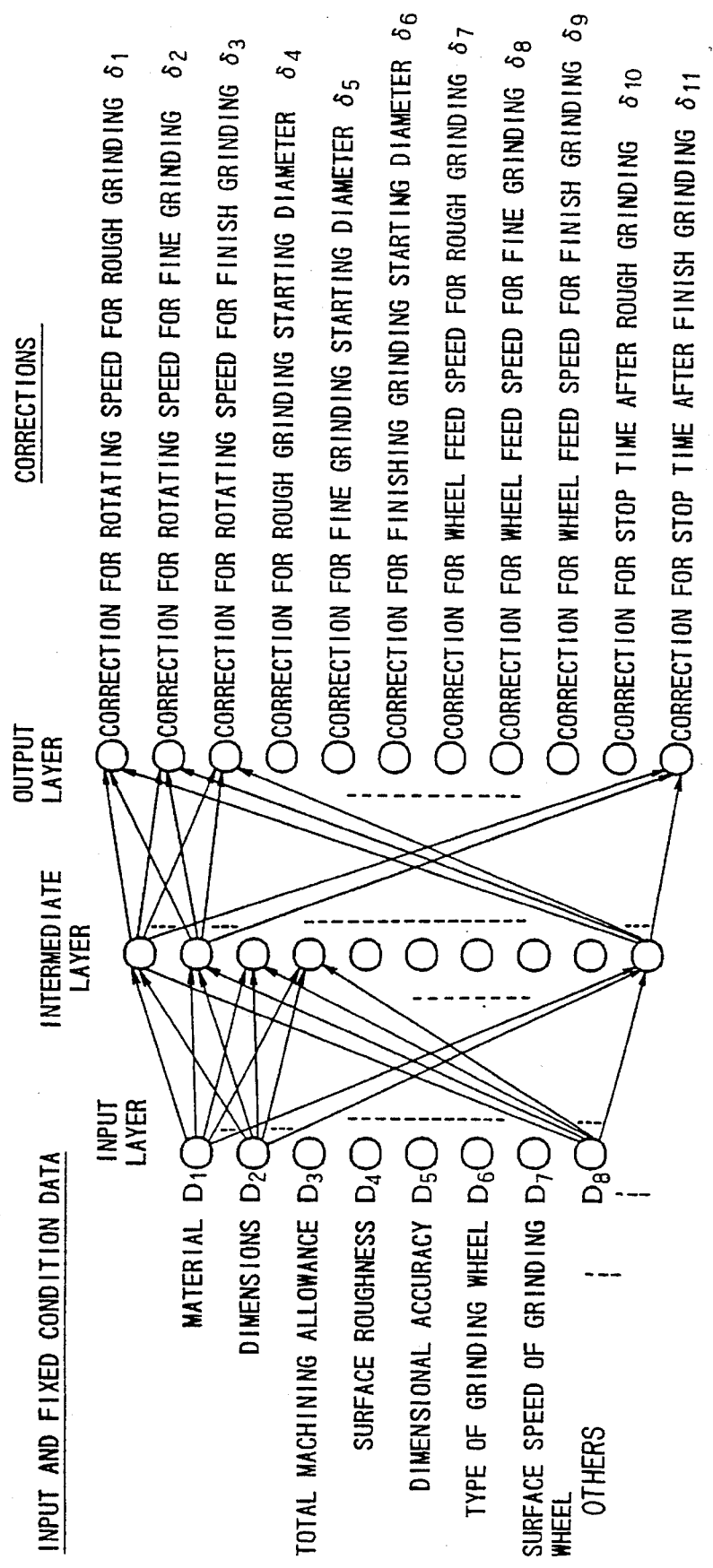
FIG. 5 is a diagram of a first neural network employed in the intelligent machining system in the first embodiment.

Combination weight factors and operation programs for the first neural network shown in FIG. 5 are stored in the first neural network storage area 335 of the RAM 33. In this embodiment, the first neural network is of a three-layer construction having an input layer, an intermediate layer and an output layer.

As is generally known, the elements of the second layer, i.e., the intermediate layer, and third layer, i.e., the output layer, of the neural network are defined as those that execute operations expressed by the following expressions.

The output $O_j^i$ of the j-th element of the i-th layer is calculated by using:

$$O_j^i = f(I_j^i)(i \geq 2) \quad (1)$$

$$I_j^i = \sum_k W_{k,j}^{i-1,i} \cdot O_k^{i-1} + V_j^i \quad (2)$$

$$f(x) = 1/\{1+\exp(-X)\} \quad (3)$$

where $V_j^i$ is a bias for the J-th element of the i-th layer, $W_{k,j}^{i-1,i}$ is a combination weight factor between the k-th element of the (i−1)-th layer and the j-th element of the i-th layer, and $O_j^1$ is the output of the j-th element of the first layer. Since the first layer directly outputs the input without operation of the above equations, $O_j^1$ is also an input value for the j-th element of the input layer (the first layer). Accordingly, $$O_j^i = D_j \quad (4)$$

where $D_j$ is input and fixed condition applied to the j-th element of the input layer.

Figure 6:
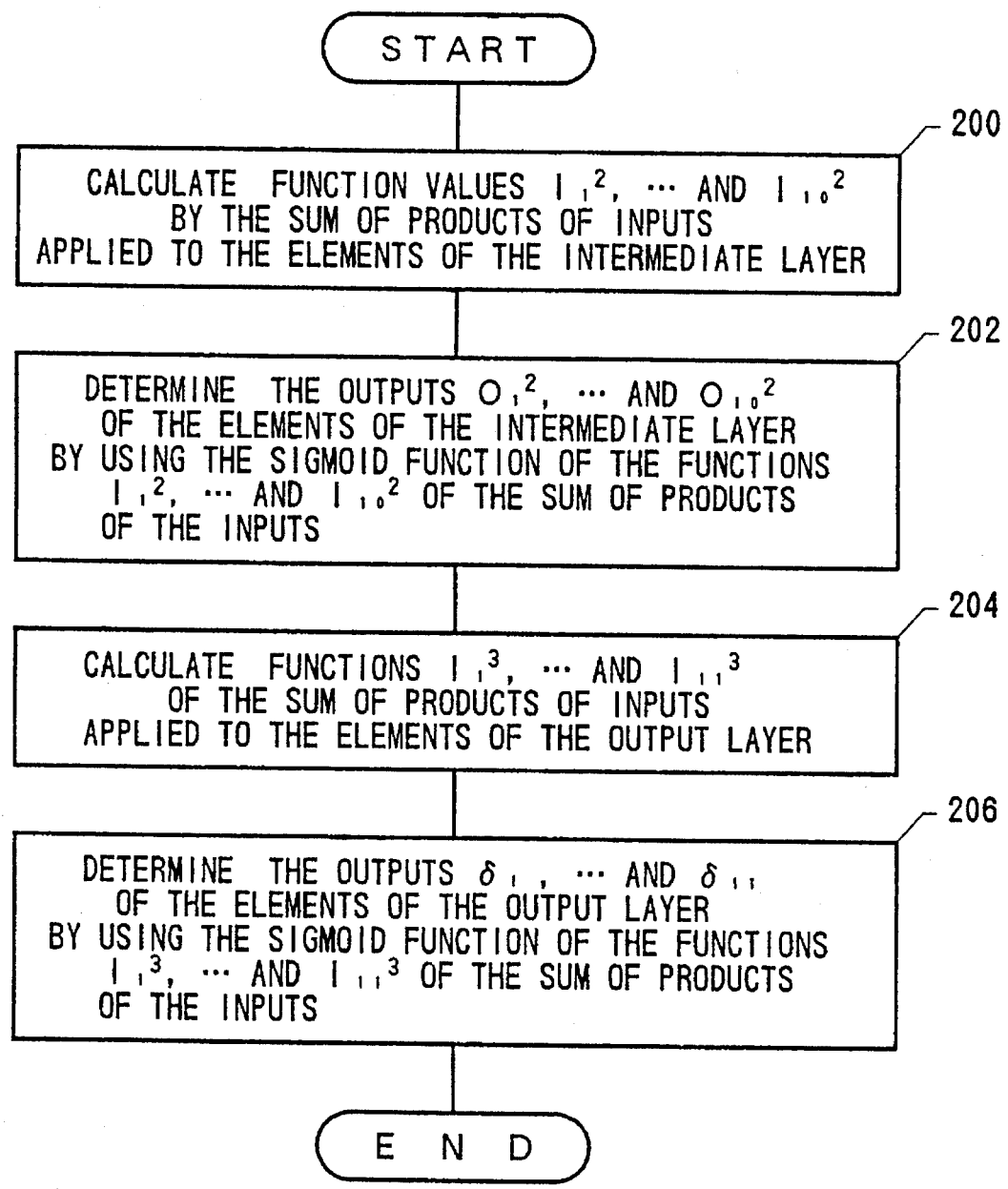
FIG. 6 is a flow chart of a calculation procedure to be executed by the first neural network of FIG. 5.

The neural network carries out operations in steps shown in FIG. 6.

In step 200, the outputs $D_1$ to $D_7$ of the elements of the input layer (the first layer) are applied to the elements of the intermediate layer (the second layer), and then the j-th element of the second layer executes an operation to obtain the sum of products expressed by:

$$I_j^2 = \sum_{k=1}^{8} W_{k,j}^{1,2} \cdot D_k \quad (5)$$

Then, in step 202, the outputs of the elements of the intermediate layer (the second layer) are calculated by using the sigmoid function of the values calculated by using Expression (5). The output of the j-th element of the second layer is calculated by using:

$$O_j^2 = f(I_j^2) = 1/\{1+\exp(-I_j^2)\} \quad (6)$$

The outputs $O_j^2$ are applied to the elements of the output layer (the third layer).

Then, in step 204, the sum of products of the inputs applied to the elements of the output layer (the third layer) is calculated by using:

$$I_j^3 = \sum_{k=1}^{10} W_{k,j}^{2,3} \cdot O_k^2 \quad (7)$$

Then, in step 206, the outputs of the elements of the output layer are calculated by using a sigmoid function similarly to Expression (6). The outputs are corrections $\delta_j$ for the machining conditions.

That is, the corrections $\delta_j$ are calculated by using:

$$\delta_j = f(I_j^3) = 1/\{1+\exp(-I_j^3)\} \quad (8)$$

Returning to step 106 of FIG. 4, the reference machining conditions $V_1$ to $V_{11}$ obtained in step 102 and the corrections $\delta_1$ to $\delta_{11}$ are added, respectively, to determine the machining conditions $K_1$ to $K_{11}$. The machining conditions $K_1$ to $K_{11}$ are stored in the machining condition storage area 333 of the RAM 33.

c. Correction of Machining Condition Data

In step 108, the machining conditions $K_1$ to $K_{11}$ are displayed on the CRT display 23. Corrections are entered by operating the keyboard if necessary, and then corrected machining conditions are stored in the machining condition storage area 333 of the RAM 33. The keyboard 22 and the CRT display constitute correcting means.

d. Production of NC Data and NC Machining

In step 110, machining conditions $K_1$ to $K_{11}$ are processed to provide NC data. The NC data is stored in the NC data storage area 331 of the RAM 33.

Subsequently, the workpiece W is machined according to the NC data for trial machining. The control of trial machining is similar to that executed by the conventional machining system and hence the detailed description thereof will be omitted. Essentially, in controlling trial machining, pulse generation commands are given to the pulse generating circuit 36 according to the NC data, and the pulse generating circuit 36 gives the driving circuits DUZ and DUX command pulses to machine the workpiece W according to the NC data. After the workpiece W has completely been machined, the workpiece W is measured to obtain machined result data.

e. Evaluation of Machined Result Data

The machined result data includes, for example, total grinding time, surface roughness, dimensional accuracy, roundness, the degree of grinding crack, and the degree of chatter.

The total grinding time is measured by the CPU 31, and the rest of the machined result data are measured by the operator and are entered by operating the keyboard 22. The operator determines whether or not the machined results meet desired conditions and, if not, gives desired conditions to a diagnostic block FB3.

f. Correction of Machining Conditions Based on Machined Results

The diagnostic block FB3 derives corrections by using the second neural network to correct the machining conditions (static machining conditions) determined by the automatic machining condition determining block FB1.

Figure 7:
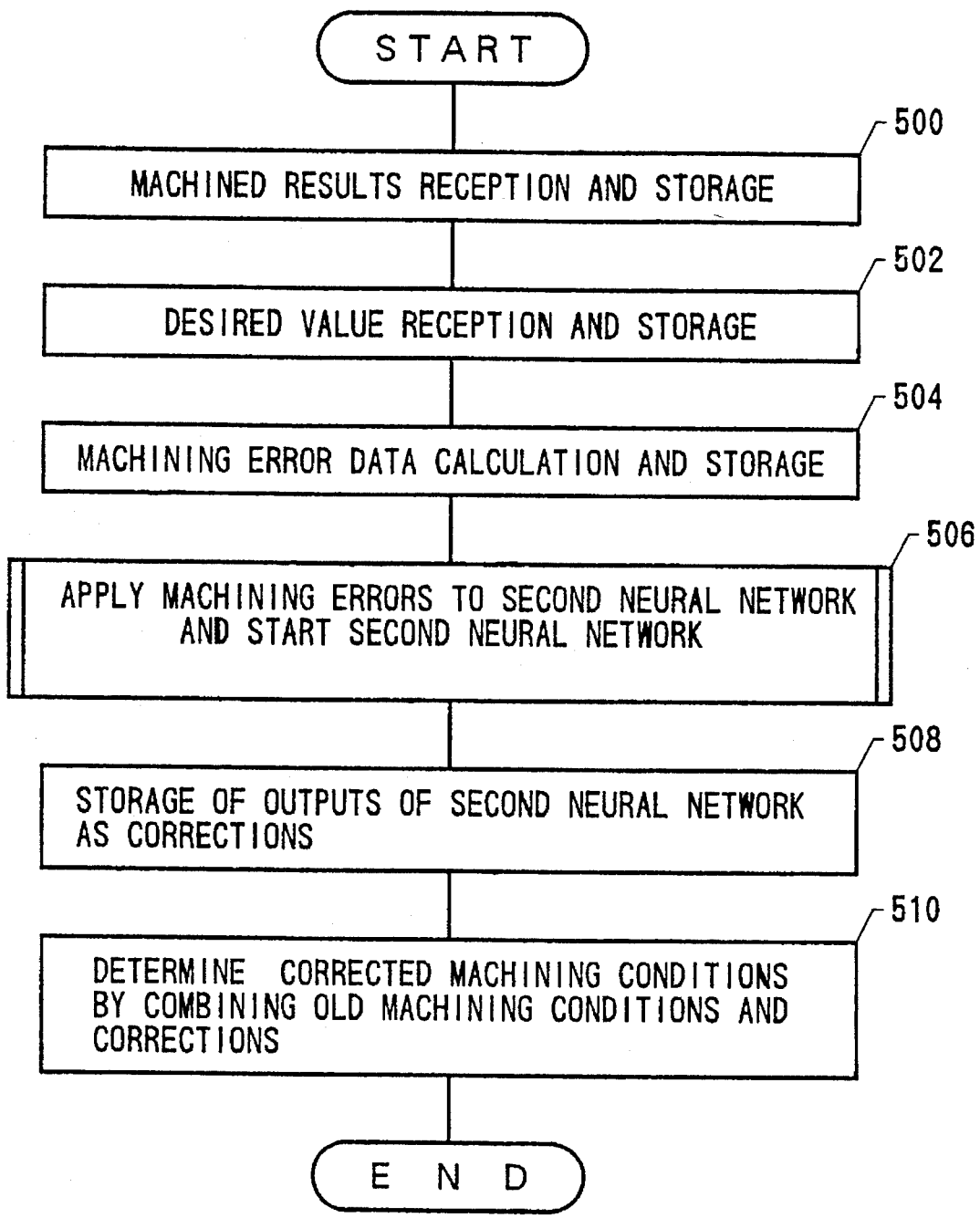
FIG. 7 is a flow chart of a machining condition data correcting procedure to be executed on the basis of machining error data by the CPU of the intelligent machining system in the first embodiment.

FIG. 7 shows the operation of the CPU 31 corresponding to the function of the diagnostic block FB3. In step 500, the measured machined results are entered by operating the keyboard 22 to store the same in the machined result storage area 334 of the RAM 33.

In step 502, desired machined results are entered by operating the keyboard 22 to store the same in the RAM 33.

Figure 9:
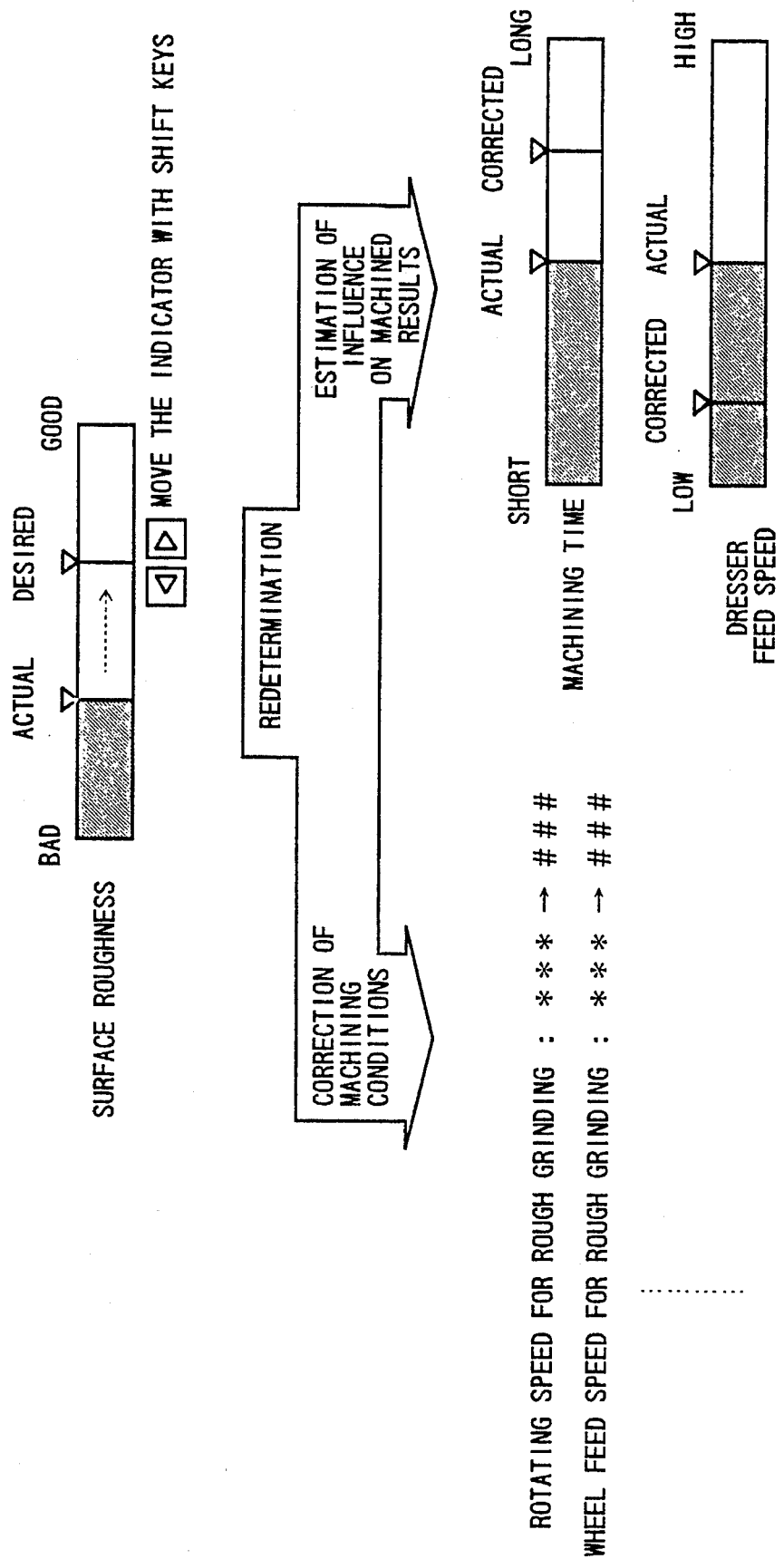
FIG. 9 is a view of diagnostic information displayed on the screen of a CRT display employed in the intelligent machining system in the first embodiment.

Suppose that the measured surface roughness does not meet a desired surface roughness. Then, the surface roughness is changed by operating the keyboard 22 and, consequently, a rectangular scale for displaying the degree of surface roughness, and a linear indicator accompanied by a triangular mark for indicating surface roughness on the scale are displayed on the screen of the CAT display 23 on the operator's console 20 as shown in FIG. 9.

The evaluation of the existing surface roughness is indicated on the scale by an existing surface roughness indicator. The color of the scale is changed at a position corresponding to the existing surface roughness indicator to facilitate visual recognition.

A desired surface roughness indicator is located at a position on the scale corresponding to a desired surface roughness by operating the keyboard 22. The desired surface roughness is stored in the RAM 33.

In step 504, machining errors, namely, the deviations of the machined results from desired values, are calculated, and the calculated machining errors are stored in the RAM 33. The machining errors are a total grinding time error $H_1$, a surface roughness error $H_2$, a dimensional error $H_3$, a roundness error $H_4$, a grinding crack degree error $H_5$, a chattering degree error $H_6$ and the like.

In step 506, the machining errors $H_1$ to $H_6$ stored in the RAM 33 are given to the corresponding elements of the input layer of the second neural network, and then the neural network is actuated.

In step 508, the outputs of the second neural network, namely, the corrections $\delta_1$ to $\delta_{11}$ for the machining conditions are stored in the RAM 33.

Figure 8:
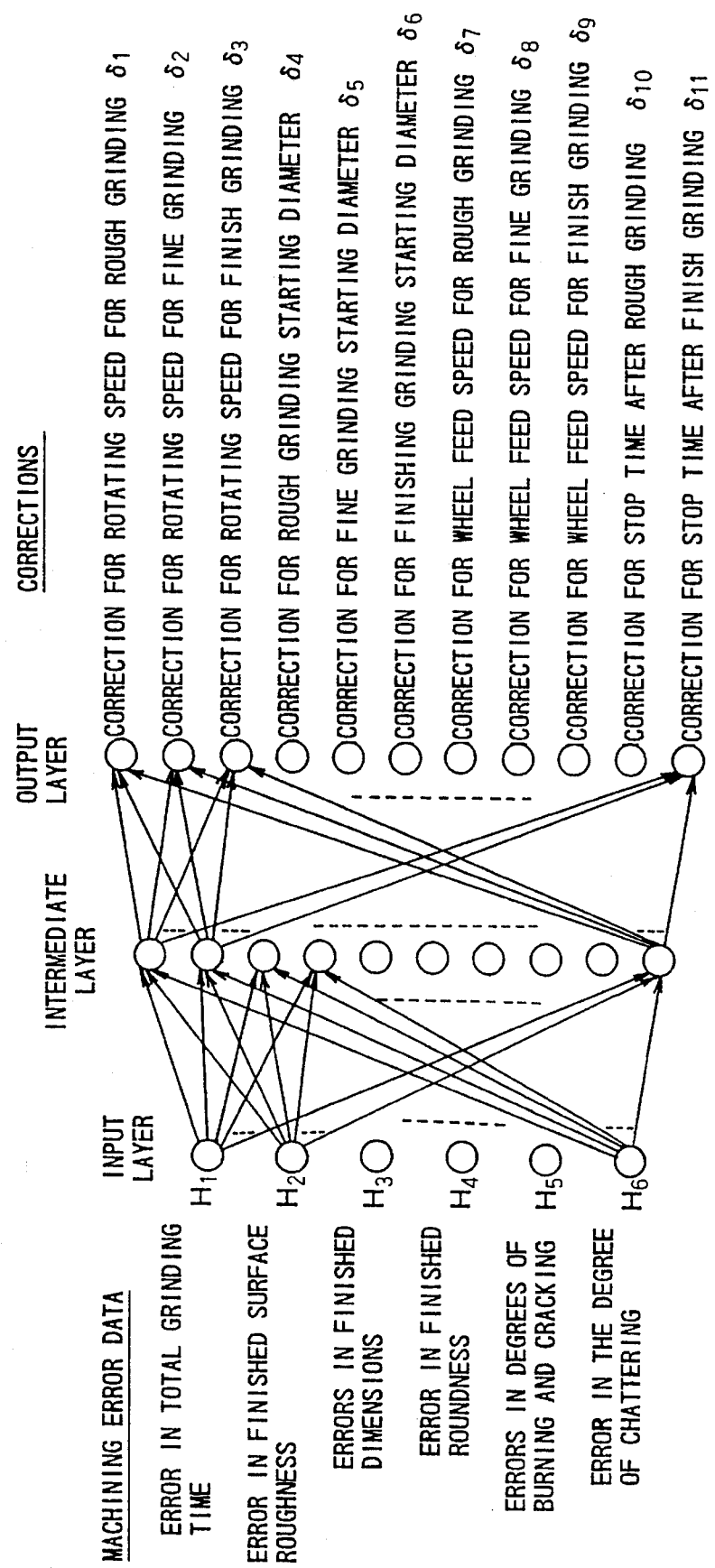
FIG. 8 is a diagram of a second neural network.

FIG. 8 shows the second neural network stored in the second neural network storage area 336 of the RAM 33. The second neural network employed in this embodiment is of a three-layer construction. The operating functions of the elements of the second neural network are identical with those of the elements of the first neural network.

In step 510, corrections $\delta_1$ to $\delta_{11}$ are added to the initial machining conditions $K_1$ to $K_{11}$ to obtain corrected machining conditions $K_1$ to $K_{11}$. The corrected machining conditions $K_1$ to $K_{11}$ are displayed on the screen of the CAT display 23 of the operator's console 20 as shown in the lower left-hand section of FIG. 9.

Thus, the reference machining conditions are corrected by the condition adapting block FB11 having the first neural network, and then the corrected reference machining conditions are corrected again taking into consideration the machining errors by the diagnostic block FB3 having the second neural network to provide further accurate machining conditions.

Furthermore, the first neural network is taught directly by the operator when the machining conditions are corrected and when large corrections are provided by the second neural network. The first neural network is able to determine appropriate machining conditions as learning advances; that is, the advancement of the first neural network in learning reduces corrections to be made by the second neural network and enables the first neural network to determine appropriate machining conditions without requiring trial machining.

The teaching data is given to the first and second neural networks by the operator when the neural networks provides in appropriate outputs during operation. The set of the input data and the teaching data are stored in the teaching data storage area 339 of the RAM 33. When the neural networks need learning, the neural networks are taught by the combination of the input data and the teaching data stored in the teaching data storage area 339.

g. Learning Procedure for First Neural Networks

A learning procedure represented by a learning block FB2 in FIG. 3 to be executed by the first neural network will be described hereinafter.

The learning of the combination weight factors of the neural network shown in FIG. 5 is carried out by a well-known back propagation method.

The learning is carried out when the learning of the combination weight factors which have previously been learned must learn again for practical use; that is, when the corrections provided by the first neural network are not appropriate, and when machining errors in a workpiece machined according to machining conditions corrected by the first neural network are large, namely, when the output corrections of the second neural network are large.

Figure 10:
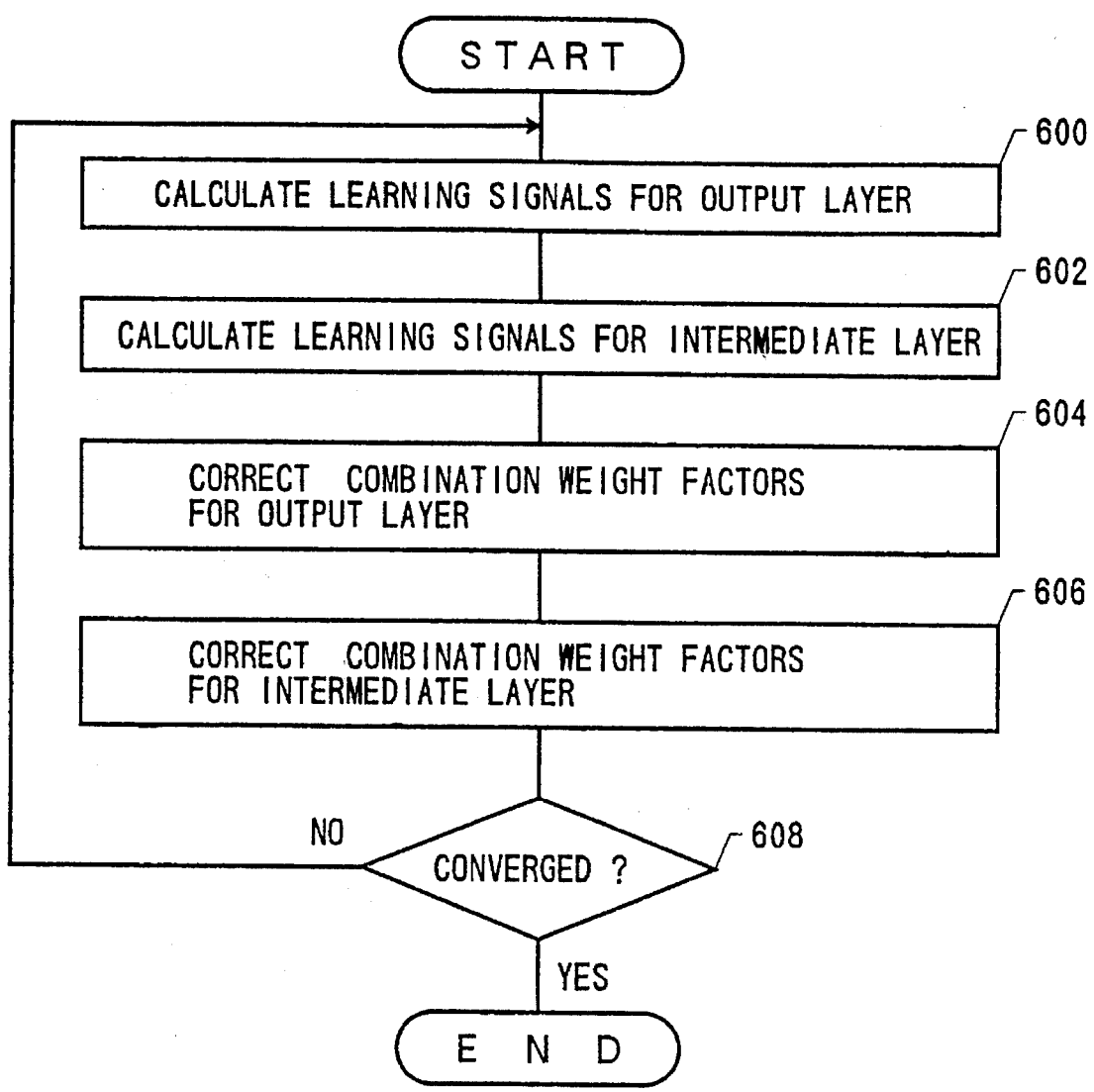
FIG. 10 is a flow chart of a learning procedure to be executed by the first neural network.

In step 600 of FIG. 10, a learning signal for each element of the output layer is calculated by using:

$$Y_j^3 = (T_j - \delta_j) \cdot f'(I_j^3) \tag{9}$$

where $T_j$ is a teaching signal for a correction $\delta_j$, and $f'(x)$ is the derivative of a sigmoid function. A correction specified by the operator or a correction determined through diagnosis on the machined workpiece are used as a teaching signal.

In step 602, a learning signal for the intermediate layer is calculated by using:

$$Y_j^2 = f'(I_j^2) \cdot \sum_{k=1}^{11} Y_k^3 \cdot W_{j,k}^{2,3} \tag{10}$$

In step 604, the combination weight factor of each element of the output layer is corrected by a correction calculated by using:

$$\Delta\omega_{i,j}^{2,3}(t) = P \cdot Y_j^3 \cdot f(I_i^2) + Q \cdot \Delta\omega_{i,j}^{2,3}(t-1) \tag{11}$$

where $\Delta\omega_{i,j}^{2,3}(t)$ is a variation of the combination weight between the j-th element of the output layer and the i-th element of the intermediate layer in the t-th calculation, $\Delta\omega_{i,j}^{2,3}(t-1)$ is a correction for the combination weight factor in the (t−1)-th calculation, and P and Q are proportional constants. Therefore, a corrected combination weight factor is calculated by using:

$$W_{i,j}^{2,3} + \Delta\omega_{i,j}^{2,3}(t) \rightarrow W_{i,j}^{2,3} \tag{12}$$

In step 606, the combination weight factor of each element of the intermediate layer is corrected.

A correction for the combination weight factor is calculated, similarly to that for the combination weight factor of each element of the output layer, by using:

$$\Delta\omega_{i,j}^{1,2}(t) = P \cdot Y_j^2 \cdot f(I_i^1) + Q \cdot \Delta\omega_{i,j}^{1,2}(t-1) \tag{13}$$

Therefore, a corrected combination weight factor is calculated by using:

$$W_{i,j}^{1,2} + \Delta\omega_{i,j}^{1,2}(t) \rightarrow W_{i,j}^{1,2} \tag{14}$$

In step 608, it is judged whether or not the correction for the combination weight factor is not greater than a predetermined value, namely, if the combination weight factor has converged.

If the judgment in step 608 is negative, the procedure returns to step 600 to correct the combination weight factor again by repeating the same calculations for other input and fixed conditions by using the newly corrected combination weight factor. The learning of the neural network is carried out for all the teaching signals by repeating the calculations using corrections specified by the operator or corrections determined through diagnosis on the machined workpiece as teaching signals.

h. Adaptive Control

Adaptive control to be executed for practical grinding operation by the intelligent machining system of the present invention will be described hereinafter particularly in connection with the dynamic correction of wheel feed speed according to detected machining circumstances.

Figure 11:
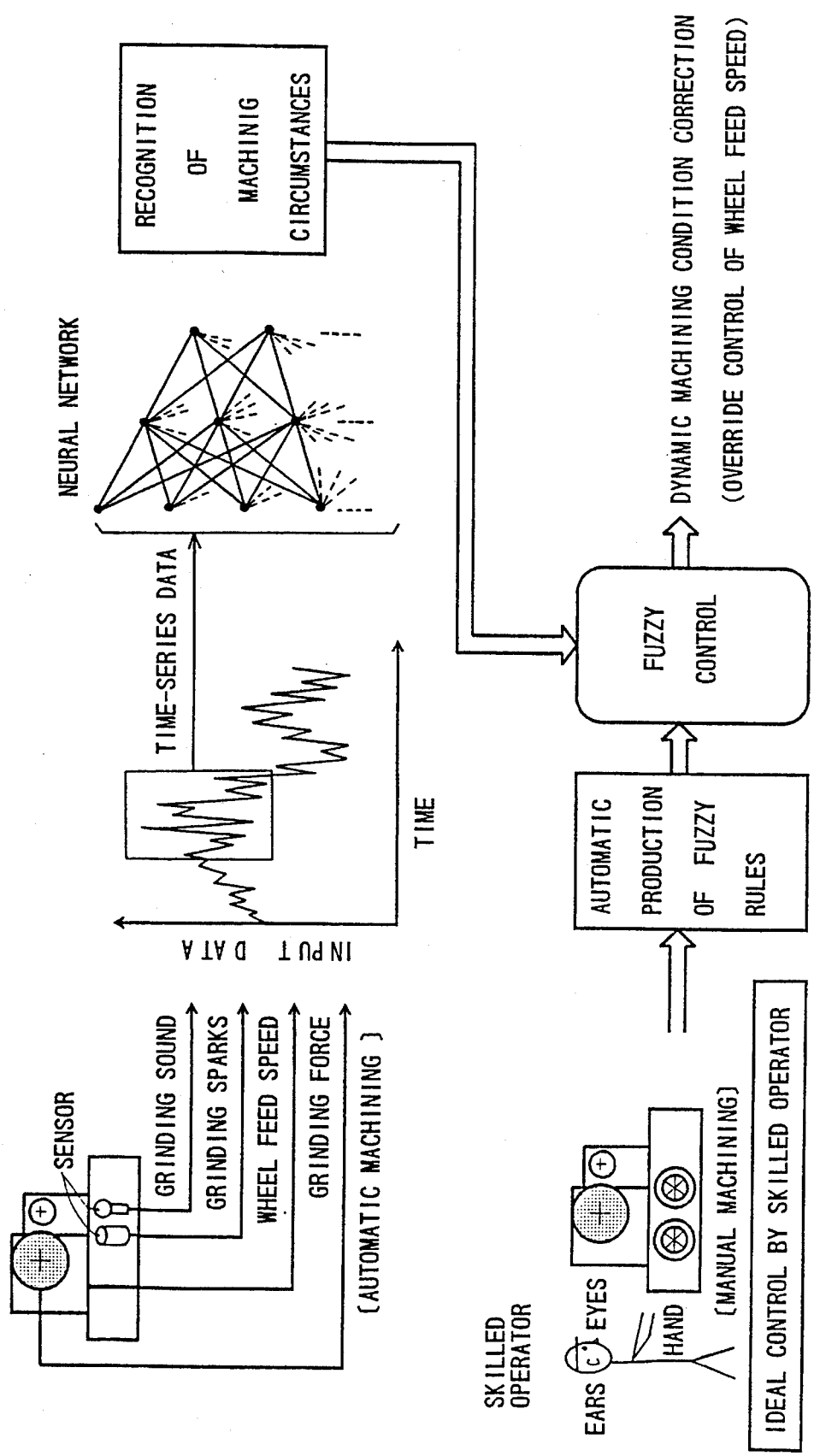
FIG. 11 is a diagram showing the conception of adaptive control to be executed by the intelligent machining system in the first embodiment.

The functions of the adaptive control is represented by an adaptive control block FB4 in FIG. 3. Referring to FIG. 11, grinding force, grinding sparks and grinding sound are sampled periodically by sensors S, and data representing grinding force, grinding sparks and grinding sound are given to a third neural network to determine grinding circumstances on the basis of the data. Then the data representing the machining circumstances are given to a fuzzy control block and the wheel feed speed is corrected dynamically according to predetermined control rules (partnership functions).

Figure 12:
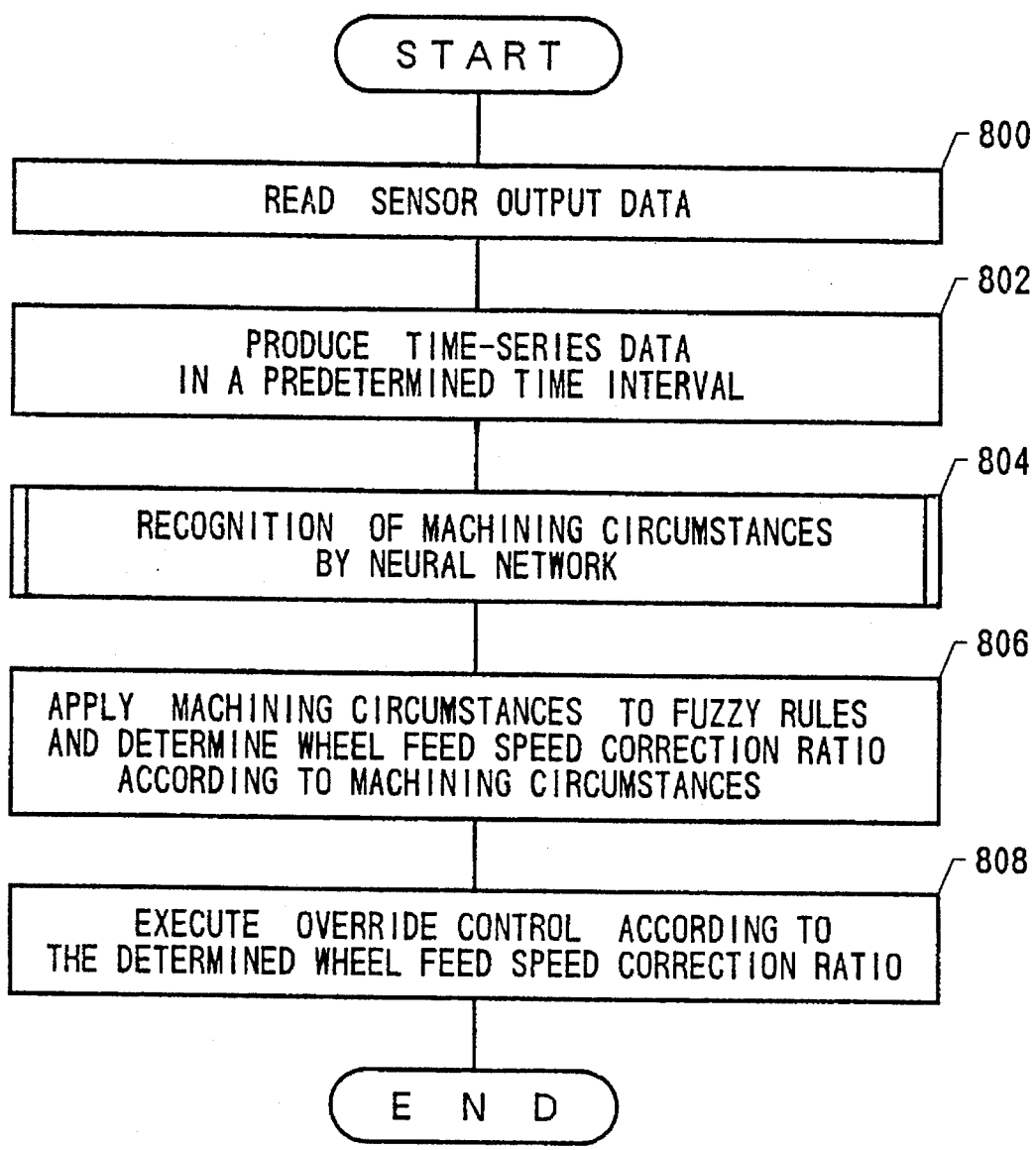
FIG. 12 is a flow chart of an adaptive control procedure to be executed by the CPU of the intelligent machining system in the first embodiment.

The adaptive control is achieved through the periodic execution of a program shown in FIG. 12 by the CPU 31.

In step 800, input data received from the sensors S are read, and then the input data received in step 800 are held for a predetermined time interval to produce time series data.

In step 804, a program for detecting the machining circumstances is executed by the third neural network, in which the time series data produced in step 802 is applied to the third neural network, and the third neural network provides data representing the existing machining circumstances.

Figure 13:
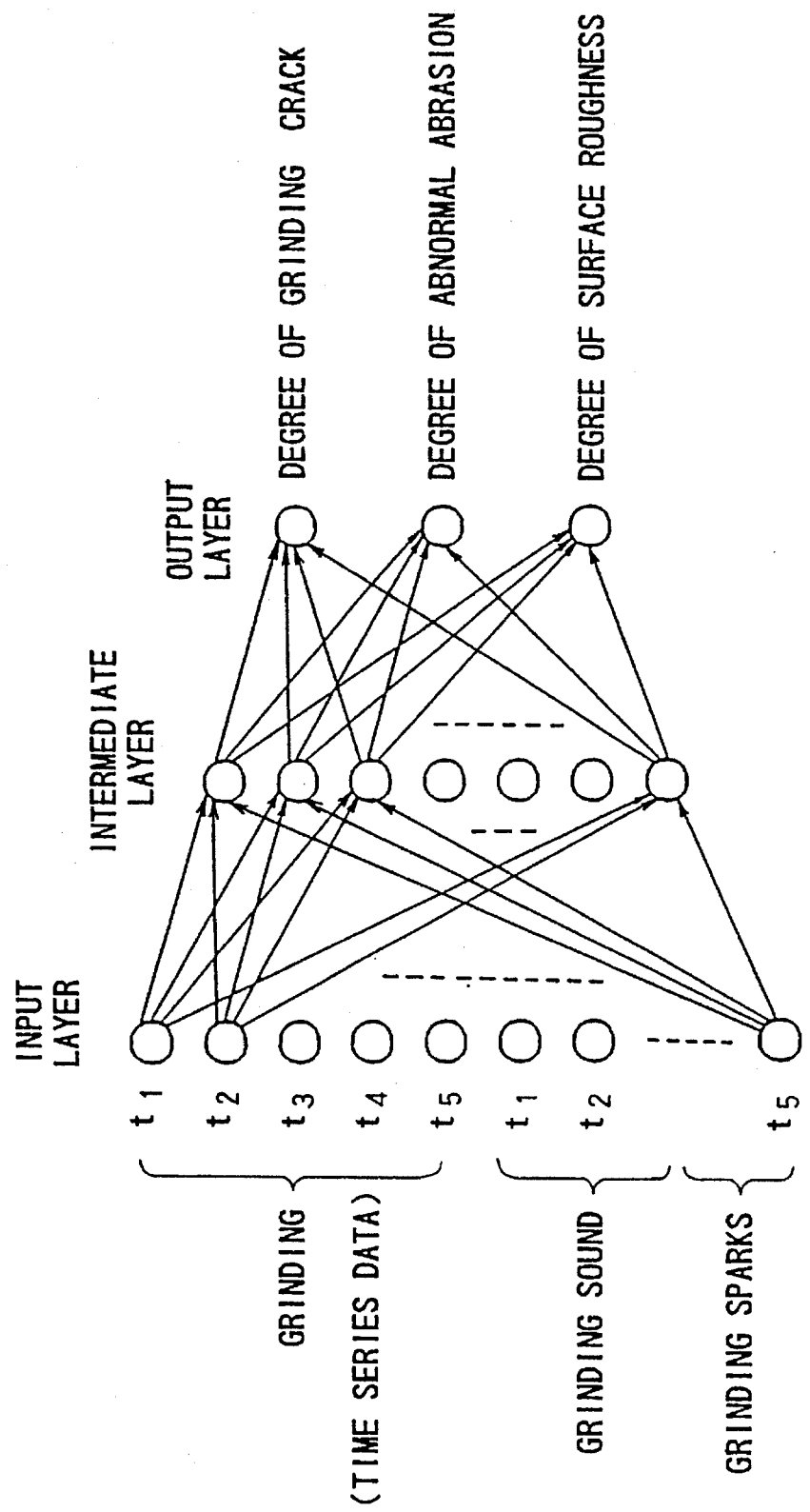
FIG. 13 is a diagram showing the construction of a third neural network.

As shown in FIG. 13, the third neural network receives the time series data of grinding force, grinding sound and grinding sparks as input data, and provides values in the range of 0 to 1 representing the degrees of grinding crack, abnormal abrasion and surface roughness. The manner of weighting of the third neural network has previously been learned on the basis of the relation between experimentally and empirically determined inputs, and outputs.

In step 806, the machining circumstances detected in step 804 are applied to a fuzzy rule for fuzzy inference computation to determine a wheel feed speed appropriate to grinding in the machining circumstances (fuzzy control in FIG. 11).

A fuzzy rule is given by an IF—THEN expression: If $I_1$=S and $I_2$=M and, ..., and $I_n$=B, then $O_1$=S, and $O_2$=B and, ..., and $O_m$=M, in which $I_1$, $I_2$, ..., and $I_n$ are input variables, namely, machining circumstance data, n is the number of input variables, $O_1$, $O_2$, ... and $O_m$ are output variables, namely, the controlled variables of the feed shaft, S (small), B (big) and M (medium) are symbols representing membership functions. The membership function S expresses a grade indicating that the input variable is small, the membership function M expresses a grade indicating that the input variable is medium, and the membership function B expresses a grade indicating that the input variable is big.

Fundamentally, the number of fuzzy rules is the n-th power of the number of membership functions, i.e., (the number of membership functions)$^n$. In this example, the number of fuzzy rules is $3^n$.

Fuzzy inference computation is carried out in the following manner. The value of each of the membership functions specified by one rule is calculated for each input variable. The minimum value (MIN-calculation) of the membership function values is regarded as the adaptation of the fuzzy rule. Such calculation is performed for all the fuzzy rules to determine the respective adaptations of all the fuzzy rules. Then, in a graph showing an output membership function specified by a THEN unit for each fuzzy rule, a region where the output variable is smaller than the calculated adaptation is determined. Such calculation is carried out for all the rules, and a maximum region (WAX-calculation) is determined by superposing the regions obtained from the rules. Then, the value of the output variable corresponding to the centroid of the maximum region is provided.

Figure 14A:
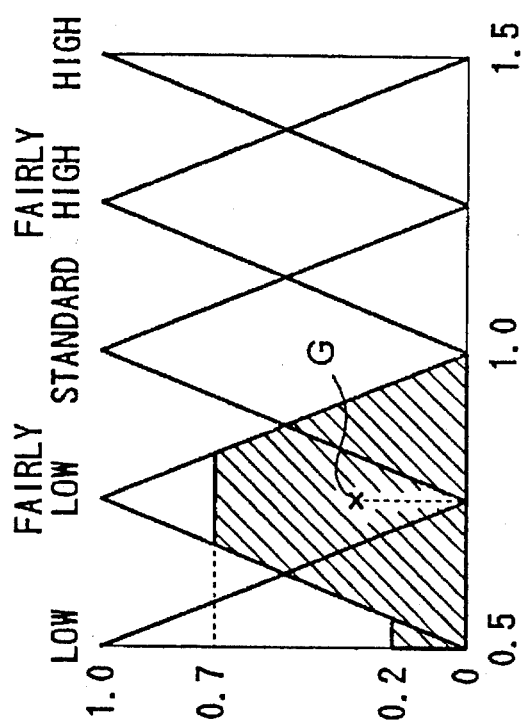
FIGS. 14A and 14B are diagrams of assistance in explaining functions of fuzzy control, showing membership functions.
Figure 14B:
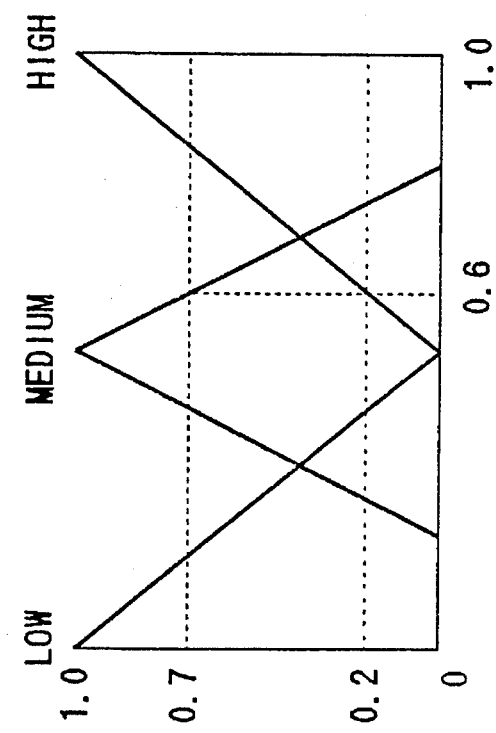

The fuzzy control will be described more concretely in connection with correction of wheel feed speed on the basis of the degree of grinding crack. FIG. 14A shows a membership function expressing the relation between the degree of grinding crack and grades indicating the probability of judging the grinding crack to be low grinding crack, medium grinding crack or high grinding crack, and FIG. 14B shows a membership function expressing the relation between wheel feed speed change ratio and grades indicating the probability of judging the wheel feed speed to be low, fairly low, standard, fairly high and high. These membership functions are stored as fuzzy rules in the fuzzy rule storage area 338 of the RAM 33.

For example, following fuzzy rules Nos. 1 and 2 are stored in the area 338. The fuzzy rule No. 1 is that if the degree of grinding crack is high, the degree of abnormal abrasion is high and the degree of surface roughness is medium, then the feed speed must be reduced. The fuzzy rule No. 2 is that if the degree of grinding crack is medium, the degree of abnormal abrasion is medium and the degree of surface roughness is low, then the feed speed must be reduced slightly. The membership functions shown in FIGS. 14A and 14B are combined on the basis of such relation to determine the wheel feed speed change ratio.

Suppose that the third neural network provides an output indicating a grinding crack degree of 0.6. Then, from FIG. 14A, the grinding crack is judged to be medium at a probability of 0.7 and to be high at a probability of 0.2.

The values, i.e., grades, of membership functions specified by the fuzzy rule are calculated for the input variables of abnormal abrasion and surface roughness. The minimum value of the membership functions of the input variables is selected as the adaptation of the same fuzzy rule. Such calculation of the minimum value is executed for each fuzzy rule. For example, if the probability of judging the degree of abnormal abrasion high is 0.3 and the probability of judging the surface roughness medium is 0.4, the adaptation of the fuzzy rule No. 1 is 0.2, which is the minimum among the grades of the three input variables. If the probability of judging the degree of abnormal abrasion medium is 0.8 and the probability of judging the degree of surface roughness low is 0.8, the adaptation of the fuzzy rule No. 2 is 0.7, which is the minimum among the grades of the three input variables.

In such a case, a triangular region corresponding to "low" of the membership function in FIG. 14B is partitioned by a horizontal line corresponding to the adaptation 0.2 of the fuzzy rule No. 1 and a region below the horizontal line is selected, and a triangular region corresponding to "fairly low" of the membership function in FIG. 14B is partitioned by a horizontal line corresponding to the adaptation 0.7 of the fuzzy rule No. 2 and a region below the horizontal line is selected. Then, both the selected regions are combined as shown by a shaded region in FIG. 14B, and a wheel feed change ratio R corresponding to the centroid G of the combined region is selected. Then, the wheel feed speed is changed in an override correction mode.

Thus, the automatically determined machining conditions are corrected automatically for optimum machining.

It is also possible to prepare a fuzzy rule for each input variable and to control the feed shaft by using the mean value of wheel feed ratio change ratios determined respectively for the input variables.

In this embodiment, the wheel feed speed is corrected dynamically by the adaptive control block FB4. It is possible to apply a wheel feed speed correction determined by the adaptive control block to correcting the weight of the first neural network for automatic machining condition determination, namely, to the learning of the first neural network.

In such a case, the speed correction ratio determined by the fuzzy control block of FIG. 11 (step 806 in FIG. 12(*c*)) is sampled periodically as corrections and the sample corrections are stored in a machining conditions applicable to a wide range of machining circumstances.

Request for changing the machining conditions on the basis of the machined results is complied with, the correction of the machining conditions, which has been possible only by a technically skilled operator, can readily be achieved by any operator regardless of the level of skill, and optimum machining conditions capable of realizing desired machined results can automatically be determined.

Furthermore, the machining conditions are optimized in a real-time control mode to deal with disturbances and unforeseen sudden variation of machining circumstances during machining operation, so that desired machined results can stably be realized.

Still further, since the automatic machining condition determining means, the diagnostic means and the adaptive control means are combined systematically to determine a desirable machining condition determined by one of the means as a machining condition in the rest of the means so that the machining conditions are improved and, consequently, very satisfactory machine results are realized.

Second Embodiment

An intelligent machining system in a second embodiment according to the present invention incorporates a modification of the first neural network of the first embodiment for determining corrections for machining conditions on the basis of input and fixed conditions.

1. Grinding Machine

The construction of a grinding machine relevant to the second embodiment is similar in construction to the grinding machine shown in FIG. 1.

2. Numerical Control Unit

The construction of a numerical control unit 30 is same as that of the numerical control unit 30 employed in the first embodiment, except that the ROM 32 and RAM 33 of the numerical control unit 30 employed in the second embodiment are different from those of the numerical control unit 30 employed in the first embodiment.

The RAM 33 has a NC data storage area 331 for storing NC programs, an input condition storage area 332 for storing input conditions including finished diameter, machining allowance, modulus of rigidity, description of part, rough machining division and operator's name, a machining condition storage area 333 for storing machining conditions including workpiece rotating speed, grinding starting position, wheel feed speed and feeding stop time after grinding, and an combination weight factor storage area 334 for storing the combination weight factors of the neural networks. The RAM 33 is backed up by a battery to hold combination weight factors acquired by learning.

Figure 18:
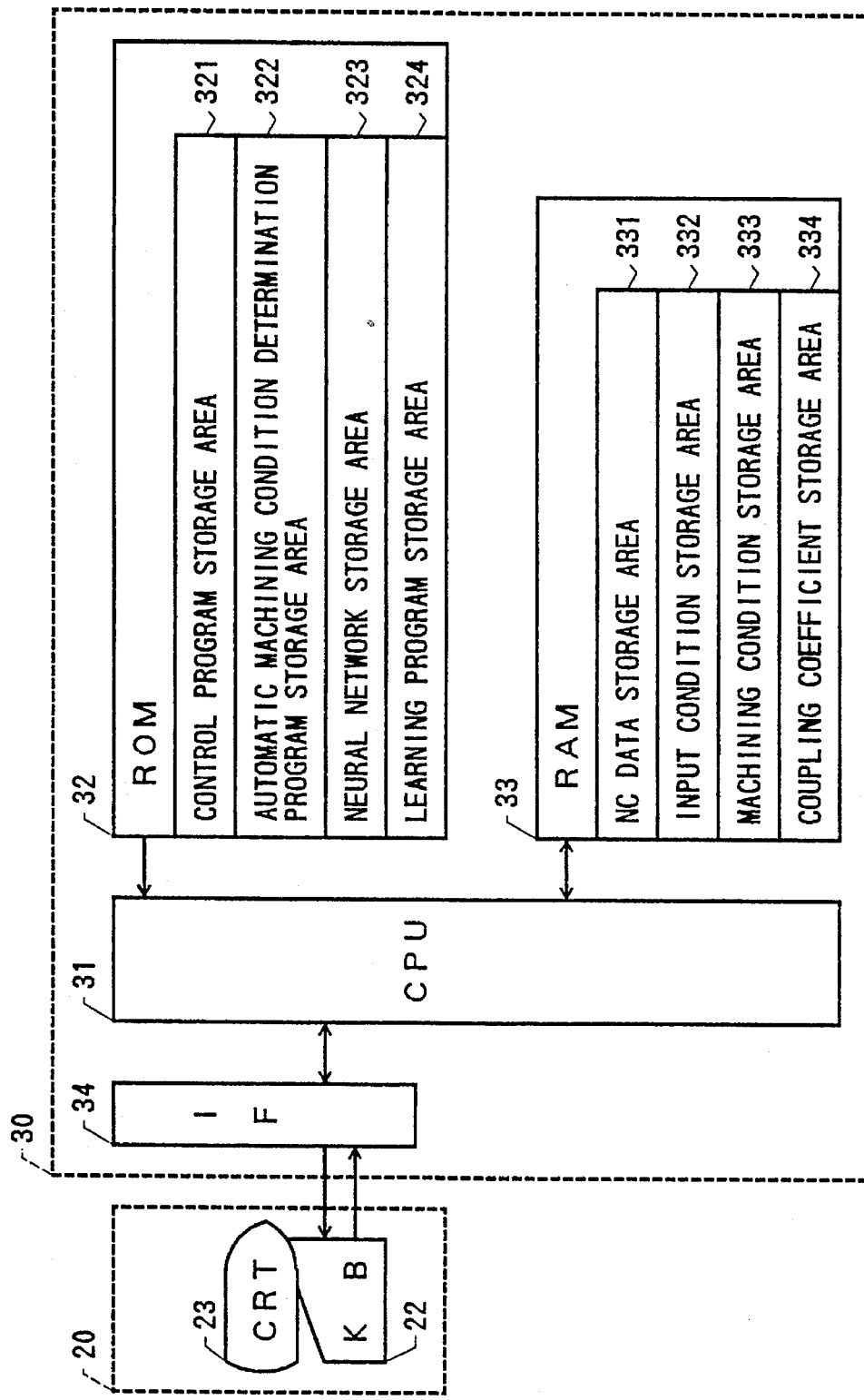
FIG. 18 is a block diagram showing the electrical configuration of a numerical control unit and an operator's console included in an intelligent machining system in a second embodiment according to the present invention.

The ROM 32 has a control program storage area 321 storing control programs for controlling the numerically controlled grinding machine according to the NC data, an automatic machining condition determination program storage area 322 storing a main automatic machining condition determination program for automatically determining machining conditions, a neural network storage area 323 storing operation programs to be executed by the neural networks, and a learning program storage area 324 storing learning programs for learning the combination weight factors of the neural networks, as shown in FIG. 18.

3. Determination of Machining Conditions

Control procedures to be executed by a CPU 31 employed in the intelligent machining system in the second embodiment will be described hereinafter with reference to flow charts.

a. Entering Input Conditions

Figure 19:
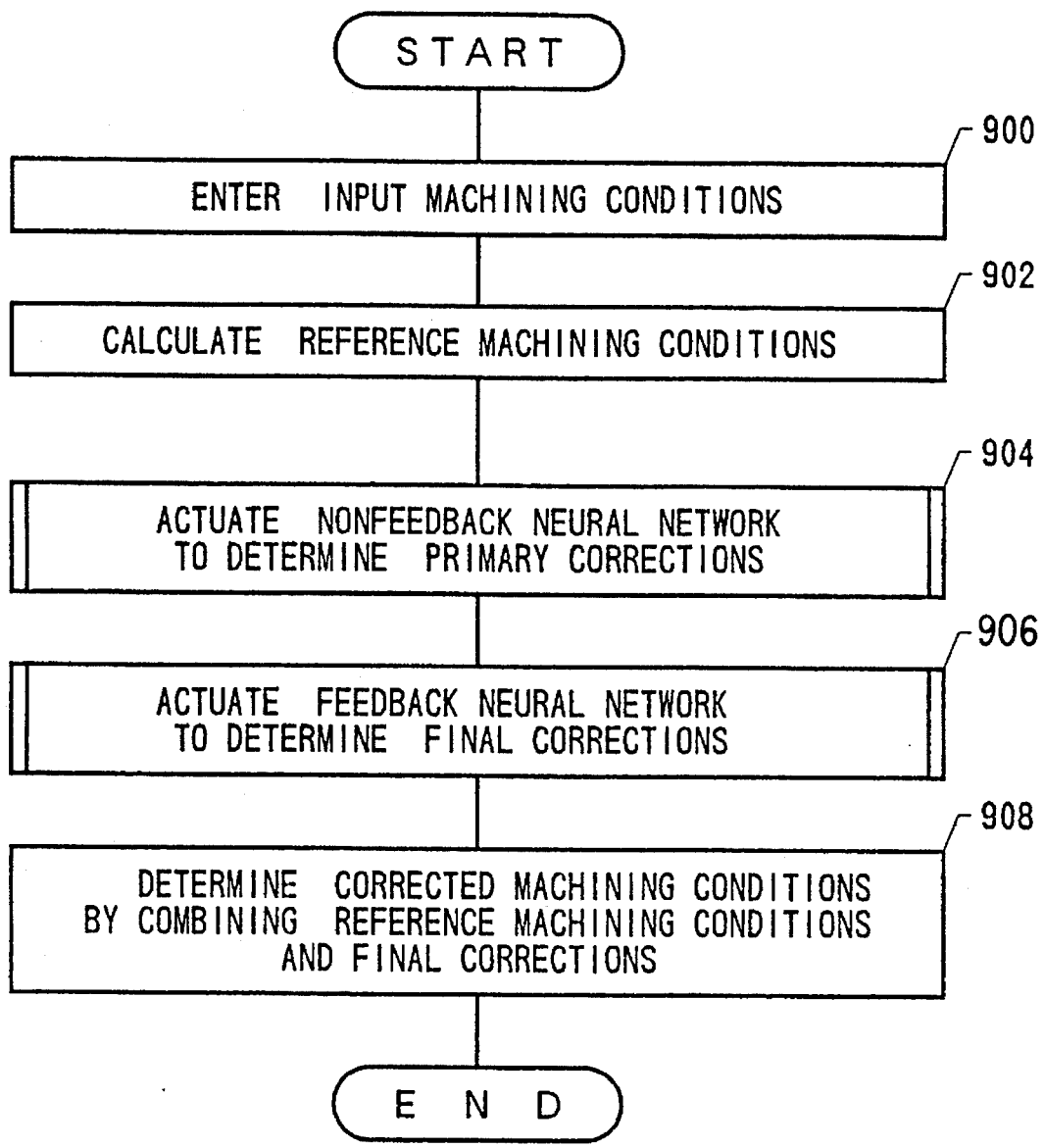
FIG. 19 is a flow chart of a main routine to be executed by a CPU included in the intelligent machining system in the second embodiment.

FIG. 19 shows the flow chart of a main program for automatically producing machining conditions on the basis of input conditions.

In step 900, input conditions entered by operating the keyboard 22 are stored in the input condition storage area 332 of the RAM 33. The input conditions include finished diameter $D_1$, machining allowance $D_2$, modulus of rigidity $D_3$, designation of part $D_4$, rough finishing division $D_5$, operator A's name $D_6$, operator B's name $D_7$, operator C's name $D_8$.

b. Calculation of Reference Machining Conditions

In step 902, reference machining conditions $V_1$ to $V_{11}$ are calculated on the basis of the foregoing input conditions $D_1$ to $D_8$ and other input conditions.

In this embodiment, machining conditions are rotating speed $K_1$ for rough grinding, rotating speed $K_2$ for fine grinding, rotating speed $K_3$ for finish grinding, rough grinding starting diameter $K_4$, fine grinding starting diameter $K_5$, finish grinding starting diameter $K_6$, rough grinding feed speed $K_7$, fine grinding feed speed $K_8$, finish grinding feed speed $K_9$, after-rough-grinding feed stop time $K_{10}$ and after-finish-grinding feed stop time $K_{11}$.

These reference conditions are calculated in the following manner. As regards the rotating speed for each grinding mode, the surface speed of the workpiece is defined beforehand as a function of required surface roughness of the workpiece for the surface speed of the grinding wheel. Surface speed of the workpiece is calculated on the basis of a specified surface roughness of the workpiece, and then rotating speed for the workpiece is calculated on the basis of the calculated surface speed and the diameter of the workpiece.

As regards the feed speed for each grinding mode, depth of cut of the grinding wheel for one full turn of the workpiece is defined beforehand as a function of dimensional tolerance. Depth of cut is calculated on the basis of a specified dimensional tolerance for the grinding mode, and then wheel feed speed is calculated on the basis of the calculated depth of cut and the rotating speed. As regards the grinding starting diameter for each grinding mode, a reference feed is determined beforehand for each grinding mode. Grinding starting diameter is calculated on the basis of the relation between the reference feed and a specified finished diameter.

As regards the feed stop time, the accumulated rotation number of the workpiece to stop the feed of the grinding wheel is determined according to whether or not sizing grinding is directed or whether or not the grinding process is divided. The rotation number of the workpiece to stop the feed of the grinding wheel is determined on the basis of the input conditions, and then feed stop time is calculated by using the rotation number.

c. Nonfeedback Neural Network

In step 904, a nonfeedback neural network is actuated, input conditions $D_1$ to $D_8$ are entered, and then primary corrections $\delta_1$ to $\delta_{11}$ for the machining conditions $K_1$ to $K_{11}$ are calculated.

Figure 20:
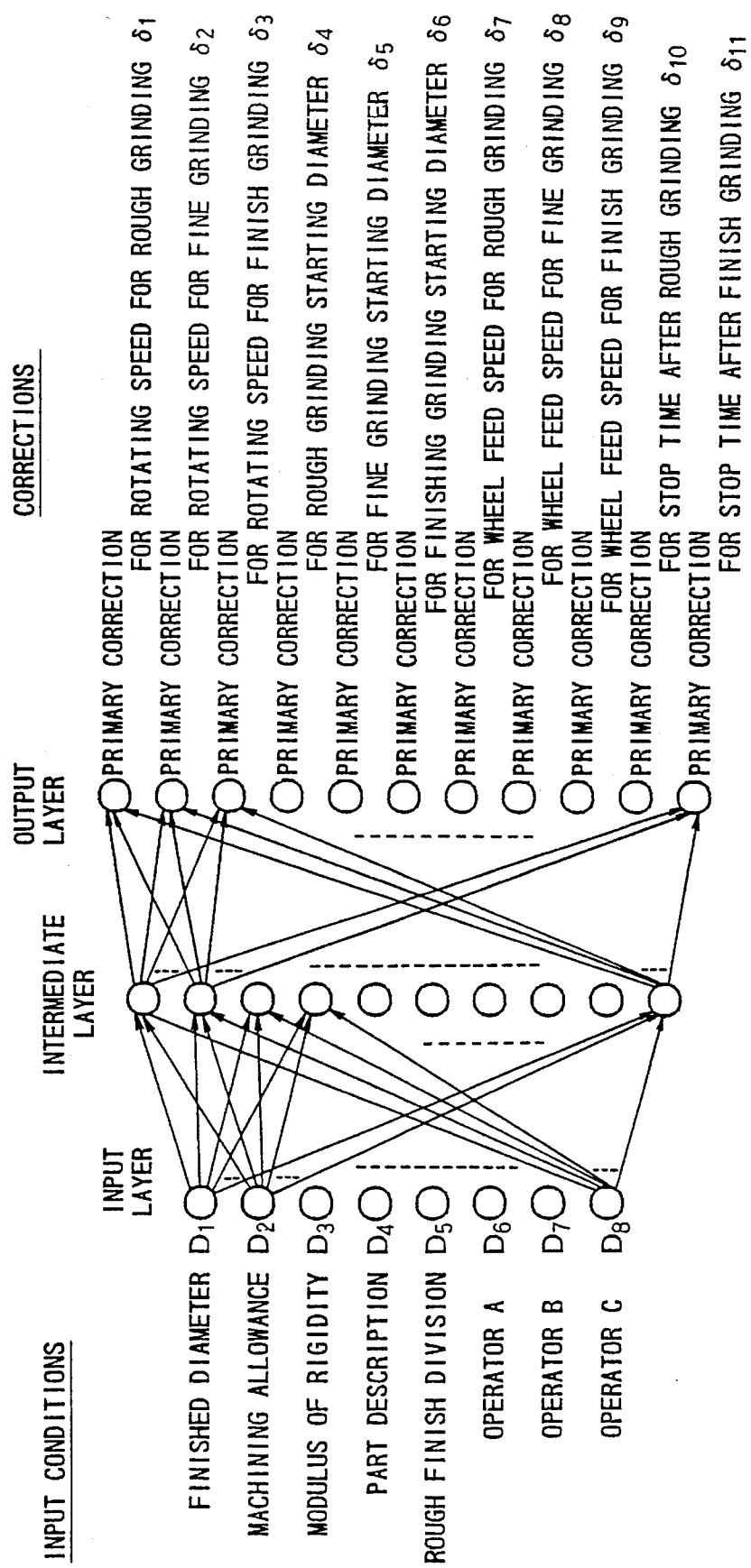
FIG. 20 is a diagram of a nonfeedback neural network employed in the intelligent machining system in the second embodiment.

FIG. 20 shows the construction of the nonfeedback neural network, which is of a three-layer construction having an input layer, an intermediate layer and an output layer. The definition of each operators of the neural network is the same as that in the first embodiment. The nonfeedback neural network performs the same operations as those shown in FIG. 6.

Outputs of the elements of the output layer of the nonfeedback neural network, i.e., the primary corrections $\delta_j$ for the machining conditions, are calculated by the operation procedure shown in FIG. 6.

d. Feedback Neural Network

Figure 21:
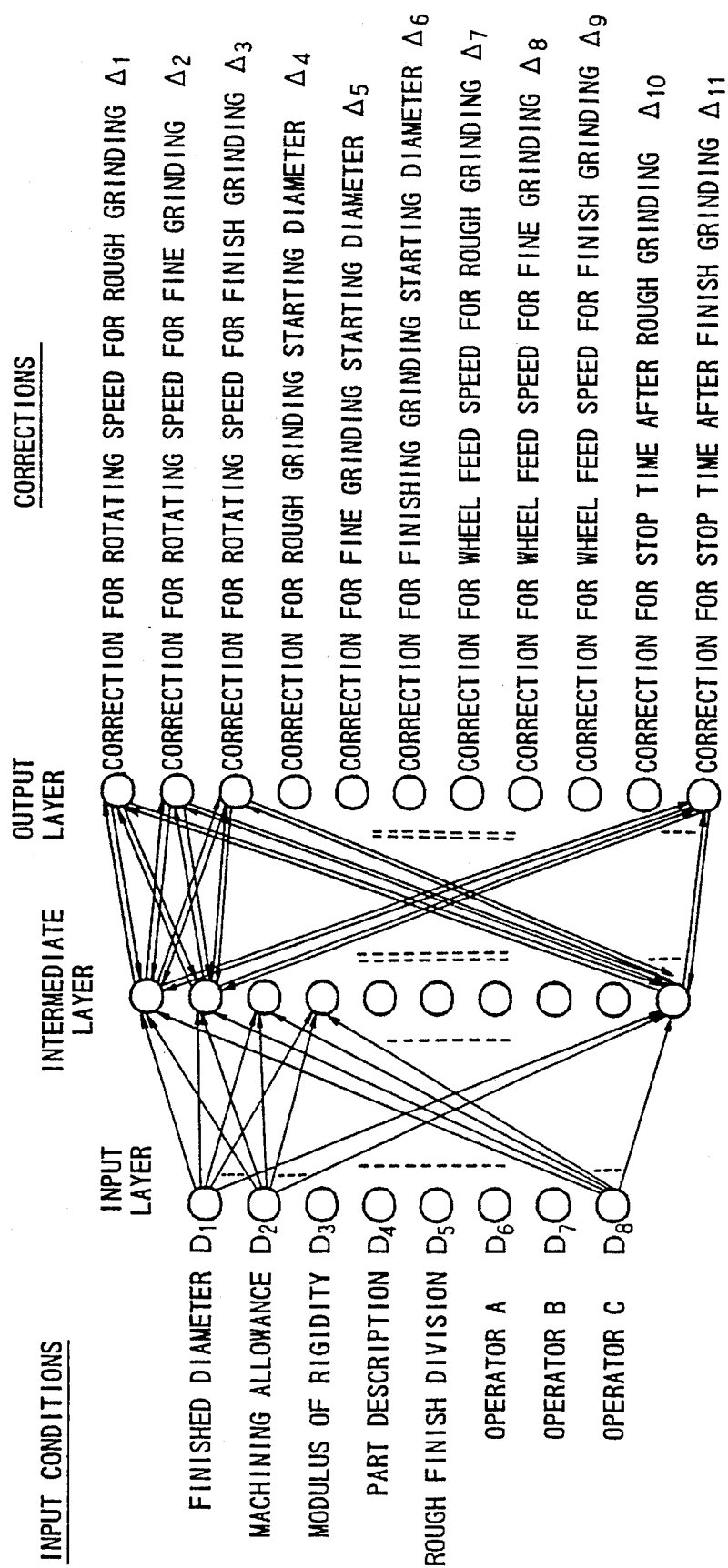
FIG. 21 is a diagram of a feedback neural network employed in the intelligent machining system in the second embodiment.
Figure 22:
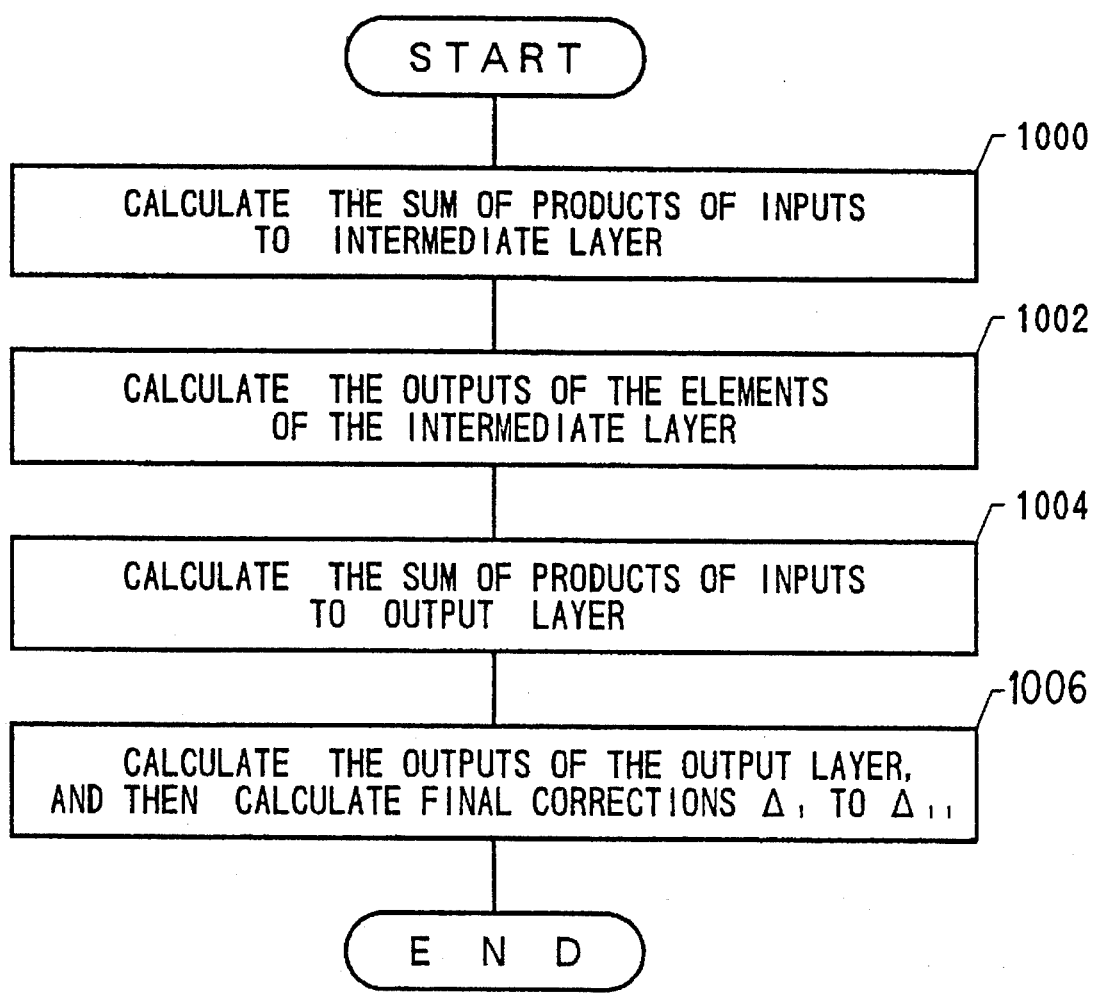
FIG. 22 is a flow chart of a procedure to be executed by the feedback neural network of FIG. 21.

In step 906 of FIG. 19, a feedback neural network carries out operation. As shown in FIG. 21, the output of each element of the output layer of the feedback neural network is applied to all the elements of the intermediate layer of the same. The feedback neural network executes a procedure shown in FIG. 22.

In step 1000, the sum of products of the inputs of the intermediate layer is calculated. Each element of the intermediate layer receives nineteen outputs in total including the eight outputs of the input layer and the eleven outputs of the output layer.

The sum of products is calculated by using:

$$I_j^2 = \sum_{k=1}^{8} W_{k,j}^{1,2} \cdot D_k^1 + \sum_{k=1}^{11} W_{k,j}^{3,2} \cdot \delta_k \quad (15)$$

Then, in step 1002, the output of the intermediate layer is calculated by using Expression (6) by the sigmoid function of the results of calculation of the sum of products of the inputs.

In step 1004, the sum of products of of the inputs of each element of the output layer is calculated by using Expression (7), and then, in step 1006, final corrections $\Delta j$ for the machining conditions are calculated by using the sigmoid function of the functional values of the sum of products of the inputs by using:

$$\Delta j = f(I_j^3) = 1/\{1 + \exp(-I_j^3)\} \quad (16)$$

The procedure returns to step 908 after corrections $\Delta_1$ to $\Delta_{11}$ for all the machining conditions have been calculated.

e. Calculation of Machining Conditions

In step 908, the reference machining conditions $V_1$ to $V_{11}$ determined in step 902 and the corrections $\Delta_1$ to $\Delta_{11}$ determined in step 906 are added, respectively, to determine the machining conditions $K_1$ to $K_{11}$.

f. Learning

The combination weight factors of the feedback neural network shown in FIG. 21 are learned, similarly to those in the first embodiment, by the procedure shown in FIG. 4.

In this embodiment, primary corrections are calculated by operating the neural network, which receives attribute data and provides corrections for the machining conditions, in a nonfeedback mode in which no data is fed back from the output layer to the intermediate layer, and then, the outputs, i.e., the primary corrections, are fed back to the intermediate layer and attribute data is applied to the input layer to provide final corrections by the output layer.

Accordingly, the influence of the corrections for the machining conditions attributable to the relation between the machining conditions is taken into consideration in the operation of the feedback neural network. Consequently, the corrections determined on the basis of the experiences and intuition of the operator can accurately be incorporated into automatic machining condition determination.

Third Embodiment

An intelligent machining system in a third embodiment according to the present invention uses the internal constants of the operation expression for determining reference machining conditions as the outputs of a neural network.

1. Numerically Controlled Grinding Machine

A numerically controlled grinding machine incorporating the intelligent machining system is identical with that shown in FIG. 1.

2. Numerical Control Unit

Figure 23:
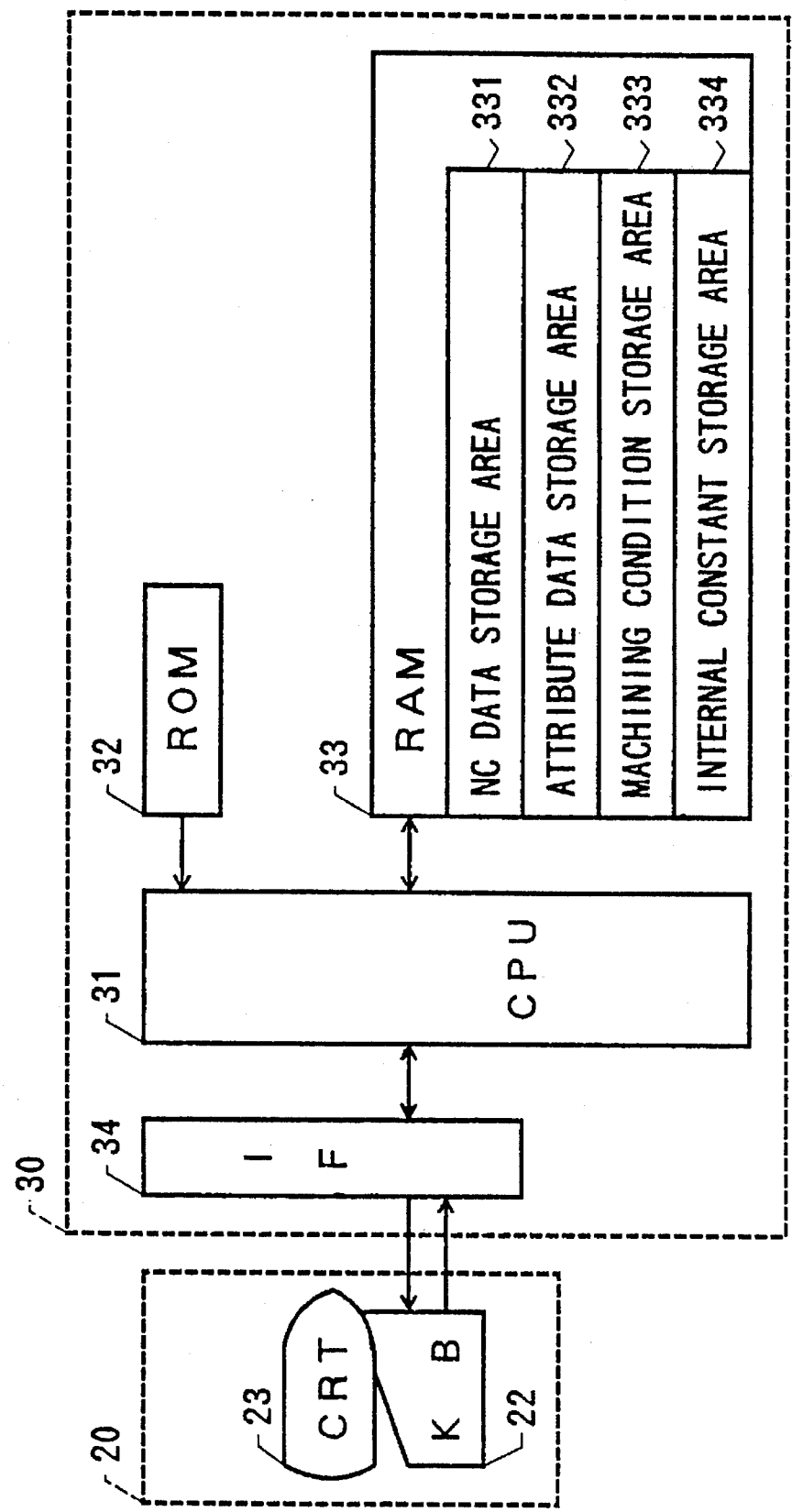
FIG. 23 is a block diagram showing the electrical configuration of a numerical control unit and an operator's console included in an intelligent machining system in a third embodiment according to the present invention.

A numerical control unit in this embodiment is the same in construction as that in the first embodiment, except that the numerical control unit in this embodiment employs a RAM 33 shown in FIG. 23, which is different from that employed in the first embodiment.

Referring to FIG. 23, the RAM 33 has a NC data storage area 331 for storing NC programs, an attribute storage area 332 for storing the data representing the attributes of the workpiece, including material, dimensions, machining allowance, surface roughness and dimensional accuracy, data representing the attributes of the tool, such as the type of the tool, and data representing the attributes of the grinding machine, including the surface speed of the tool, a machining condition storage area 333 for storing machining conditions including the rotating speed of the workpiece, wheel feed speed and machining allowance, and an internal constant storage area 334 for storing the internal constants of operation expressions for determining machining conditions.

3. Determination of Machining conditions

Figure 24:
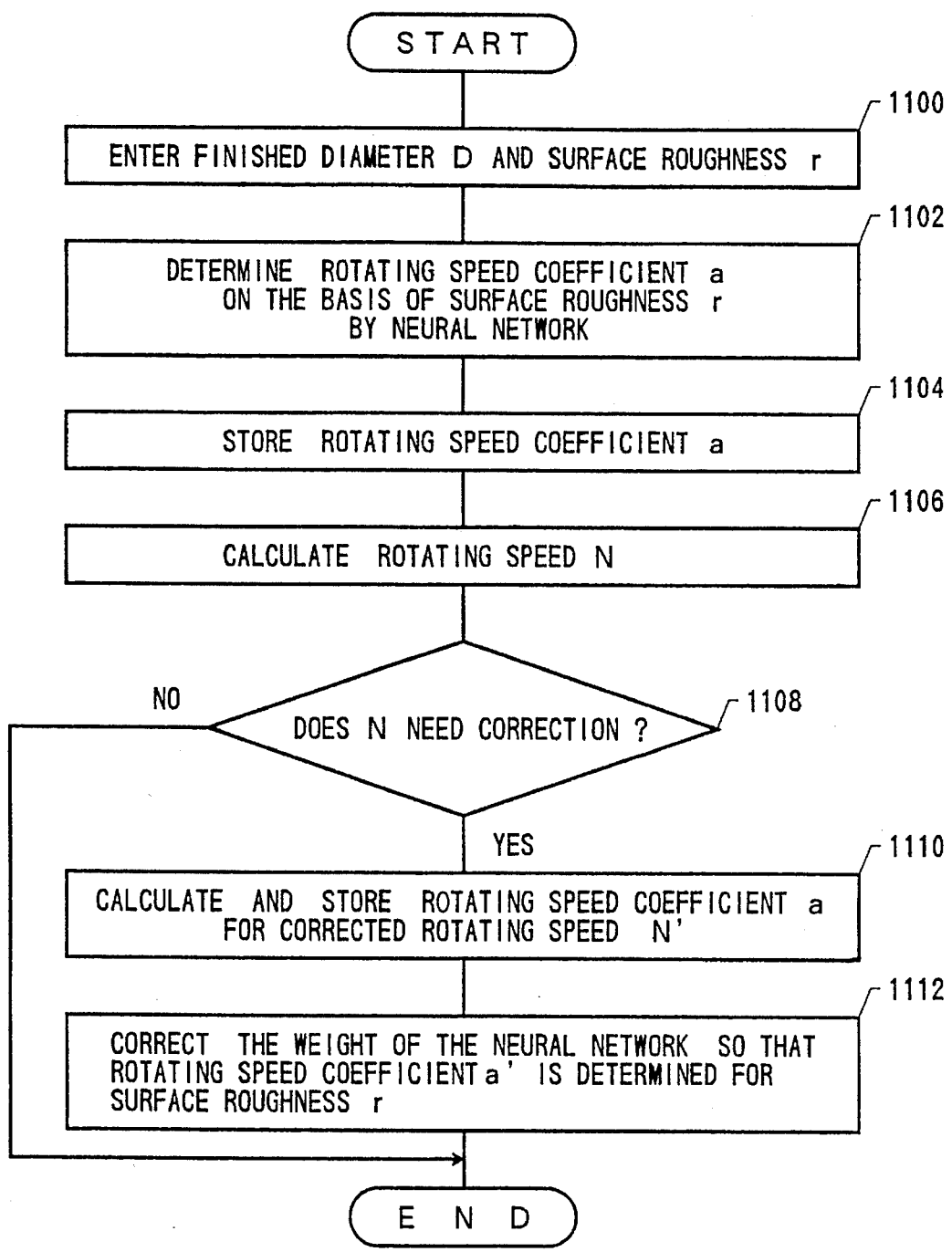
FIG. 24 is a flow chart of a procedure to be executed by a CPU included in the intelligent machining system in the third embodiment.
Figure 25:
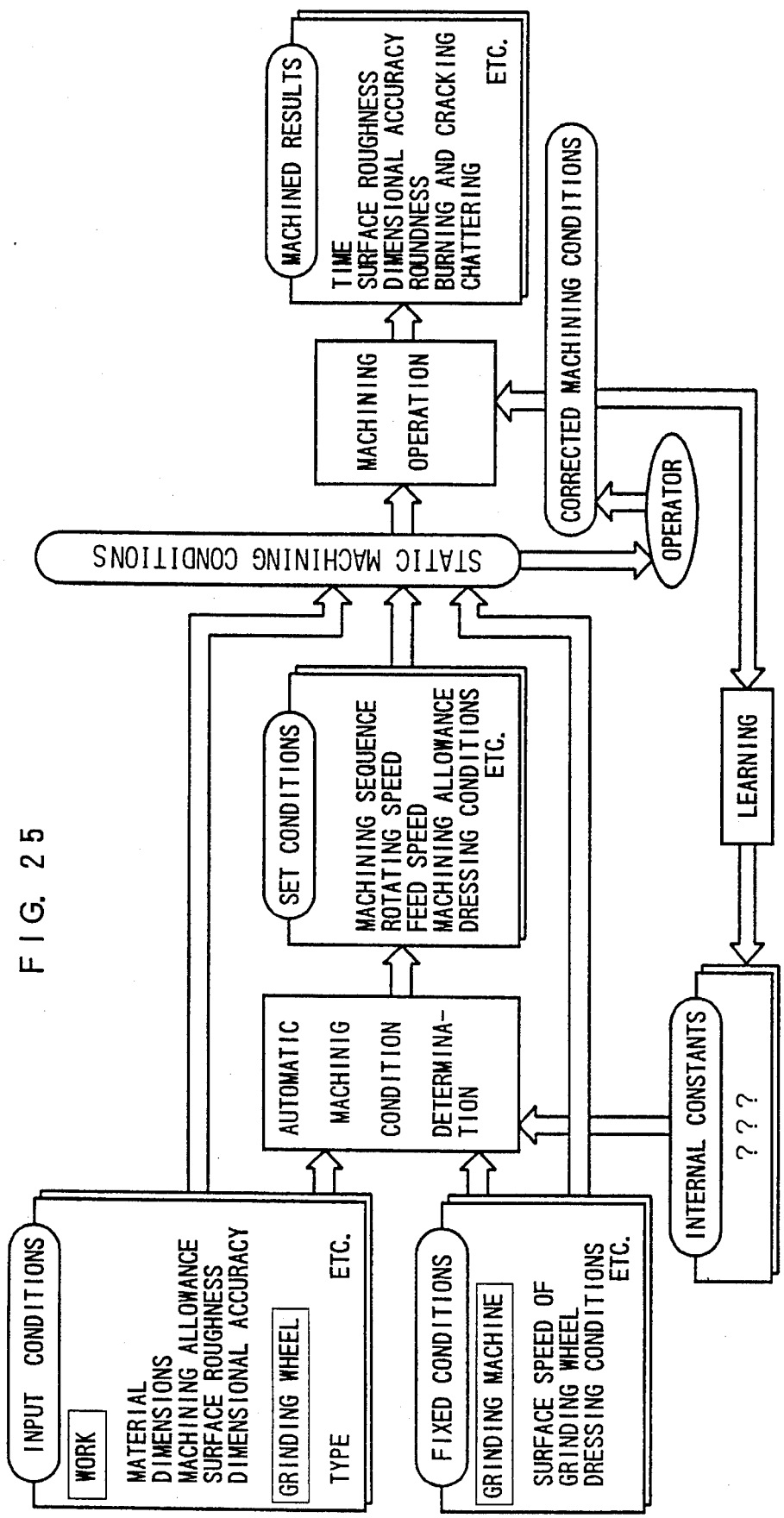
FIG. 25 is a block diagram of assistance in explaining a procedure of determining machining condition data by the intelligent machining system in the third embodiment.
Figure 26:
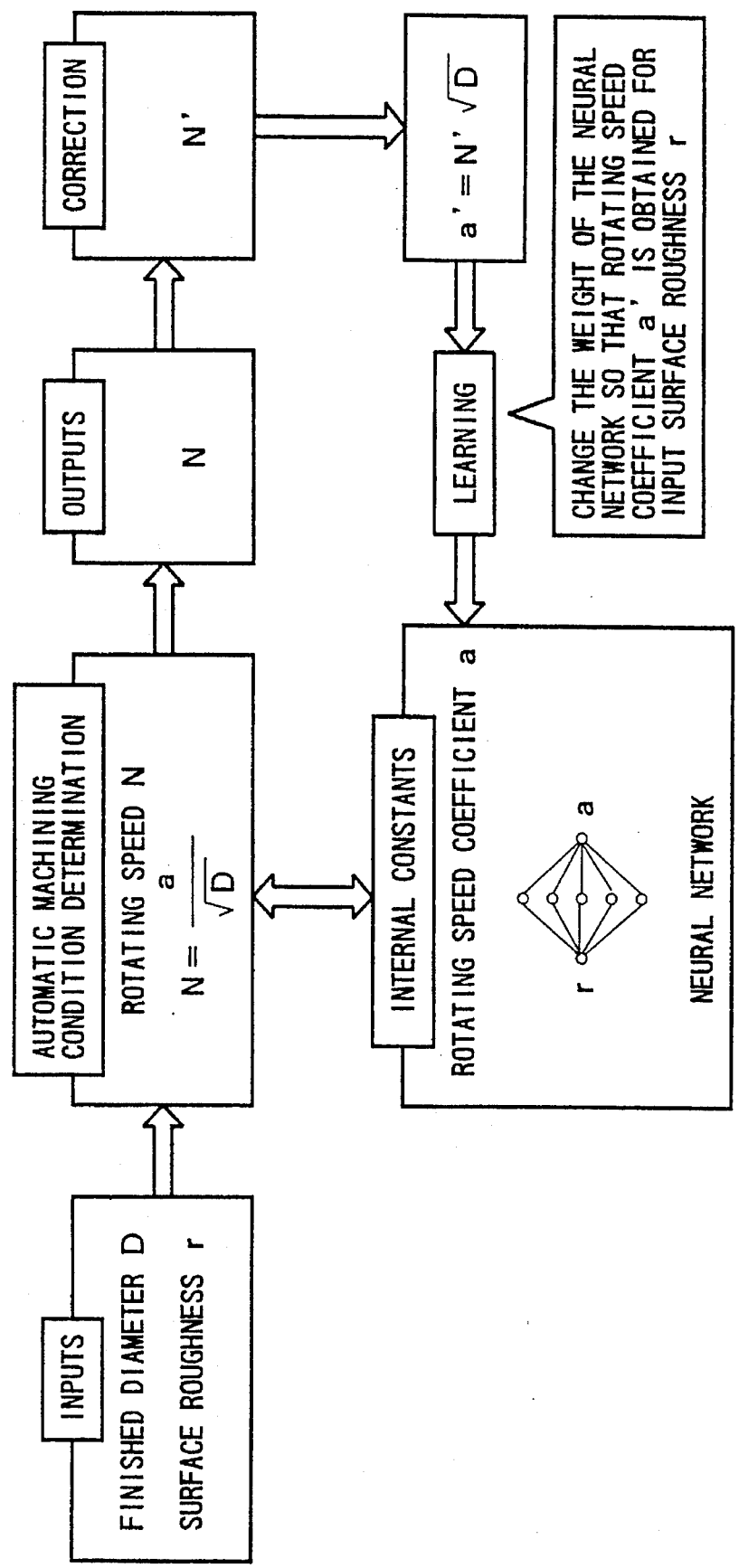
FIG. 26 is a block diagram of assistance in explaining learning functions for determining machining condition data by the intelligent machining system in the third embodiment.

A procedure of determining machining conditions will be described hereinafter with reference to FIG. 24 showing a procedure to be executed by the CPU 31, FIG. 25 showing the sequential determination of machining conditions and resultant machined results and FIG. 26 showing the learning functions for automatic machining condition determination.

The procedure of automatic machining condition determination will be described in terms of the automatic determination of rotating speed N for the workpiece, i.e., a machining condition, on the basis of finished diameter D and surface roughness r for the workpiece, i.e., input conditions.

In step 1100, finished diameter D and surface roughness r are entered (FIG. 26).

In step 1102, a rotating speed coefficient a, i.e., an internal constant, is determined on the basis of the surface roughness r by a neural network similar to that employed in the first embodiment.

In step 1104, the rotating speed coefficient a is stored in the internal constant storage area 334 of the RAM 33.

In step 1106 for achieving machining condition calculating means, rotating speed N for the workpiece is calculated by using:

$$N = a/D^{1/2}$$

The rotating speed N is displayed as a machining condition on the CRT display 23 of the operator's console and is stored in the machining condition storage area 333 of the RAM 33.

In step 1108, it is judged whether or not the rotating speed N calculated in step 1106 needs correction. If the judgment in step 1108 is affirmative, namely, if the operator determines that the rotating speed N displayed on the CAT display 23 is not appropriate, the procedure goes to step 1110.

In step 1110, a corrected rotating speed coefficient a' corresponding to a corrected rotating speed N' is calculated by using:

$$a' = N' \cdot D^{1/2}$$

and the rotating speed coefficient a previously stored in the internal constant storage area 334 of the RAM is replaced with the corrected rotating speed coefficient a'.

In step 1112, i.e., means for achieving weight correcting means, the weight of the neural network is corrected by learning so that the rotating speed coefficient a' is determined when the surface roughness r is entered, and then the procedure is ended.

Thus, the rotating speed N' of the workpiece is provided when the finished diameter D and the surface roughness r are specified in the next automatic machining condition determining operation.

If the judgment in step 1108 is negative, namely, the rotating speed N is appropriate, the procedure is ended.

Thus, in this embodiment, the neural network provides the values of the coefficients for calculating machining conditions by using the attribute data and the calculating expressions. Accordingly, the machining conditions can readily be calculated.

What is claimed is:

1. An intelligent machining system for automatically determining machining conditions and for controlling a numerically controlled machine tool to machine a workpiece in accordance with the machining conditions, said intelligent machining system comprising:

attribute data storage means for storing attribute data indicating characteristics of at least one of said workpiece and machining requirements; and machining condition calculating means for calculating the machining conditions on the basis of the attribute data, said machining condition calculating means comprising:

reference value calculating means for calculating reference machining conditions on the basis of the attribute data by the use of predetermined calculating expressions; and a first neural network responsive to the attribute data and associated with said reference value calculating means so that the reference machining conditions calculated by the reference value calculating means are corrected by said first neural network so as to output the corrected machining conditions from said machining condition calculating means to said machine tool to machine said workpiece.

2. An intelligent machining system according to claim 1, wherein said first neural network receives the attribute data for correcting the reference machining conditions and comprises at least three layers including an input layer, an intermediate layer and an output layer, and the respective outputs of the elements of the output layer are fed back to the elements of one of said input and intermediate layers, and the intelligent machining system further comprises:

first operating means for operating said first neural network in a mode where no output of the output layer is fed back to said one of said input and intermediate layers; and second operating means for applying the attribute data to the input layer to make the output layer provide the corrections in a state where the outputs of the output layer are fed back to said one of said input and intermediate layers, after said first neural network has been operated by said first operating means.

3. An intelligent machining system according to claim 1, further comprising:

teaching data storage means for storing input data accumulated during the operation of said first neural network, and teaching data corresponding to the input data; and learning means for performing the learning of said first neural network by using the input data and the teaching data stored in the teaching data storage means.

4. An intelligent machining system according to claim 1, wherein said first neural network provides corrections based on the attribute data and wherein said machining condition calculating means includes means for correcting said reference machining conditions calculated by said reference value calculating means, by using the corrections provided by said first neural network so that the corrected machining conditions are output from said machining condition calculating means.

5. An intelligent machining system according to claim 1, further comprising:

machining condition storage means for storing the machining conditions determined by the machining condition calculating means;

display means for visually displaying the machining conditions stored in the machining condition storage means for evaluation by an operator; and correction data input means for enabling the operator to input correction data so that the machining conditions stored in the machining condition storage means are manually corrected by the operator.

6. An intelligent machining system for automatically determining machining conditions and for controlling a numerically controlled machine tool to machine a workpiece in accordance with the machining conditions, said intelligent machining system comprising:

attribute data storage means for storing attribute data indicating characteristics of at least one of said workpiece and machining requirements;

a first neural network for determining, on the basis of the attribute data, elementary values used in determining the machining conditions; and machining condition calculating means for calculating the machining conditions on the basis of the attribute data stored in the attribute data storage means and the elementary values determined by the first neural network and for outputting said machining conditions to said machine tool to machine said workpiece;

wherein the machining condition calculating means has predetermined calculating expressions which are used in calculating the machining conditions, the elementary values determined by said first neural network are coefficients for the predetermined calculating expressions used in calculating the machining conditions on the basis of the attribute data, and said machining condition calculating means calculates the machining conditions on the basis of the attribute data by using the predetermined calculating expressions and the coefficients determined by the first neural network.

7. An intelligent machining system for automatically determining machining conditions and for controlling a numerically controlled machine tool to machine a workpiece in accordance with the machining conditions, said intelligent machining system comprising:

attribute data storage means for storing attribute data indicating characteristics of at least one of said workpiece and machining requirements; and machining condition calculating means for calculating the machine conditions on the basis of the attribute data, said machining condition calculating means comprising:

reference value calculating means for calculating reference machining conditions on the basis of the attribute data by the use of predetermined calculating expressions; and a first neural network responsive to the attribute data and associated with said reference value calculating means so that the reference machining conditions calculated by the reference value calculating means are corrected by said first neural network so as to output the corrected machining conditions from said machining condition calculating means to said machine tool to machine said workpiece;

wherein said intelligent machining system further comprises:

machining condition storage means for storing the machining conditions determined by said machining condition calculating means;

error data storage means for storing machining errors relative to values representing desired machining results;

a second neural network which receives the machining errors stored in the error data storage means and provides corrections for the machining conditions;

control means for controlling said second neural network so as to receive the machining errors and to provide the corrections; and correction storage means for storing the corrections provided by said second neural network, for use in subsequently correcting the machining conditions stored in said machining condition storage means.

8. An intelligent machining system according to claim 7, further comprising learning means for performing the learning of said first neural network, which receives the attribute data, on the basis of corrections for correcting the machining conditions, provided by said second neural network, which receives machining error data.

9. An intelligent machining system according to claim 7, further comprising:

correcting mean for correcting the machining conditions stored in said machining condition storage means by using the corrections provided by said second neural network.

10. An intelligent machining system according to claim 7, further comprising:

correction data input means for enabling an operator to input correction data so that the machining conditions stored in the machining condition storage means are manually corrected by the operator; and learning means for performing the learning of the first neural network which is associated with the reference value calculating means for calculating the machining conditions, by using both of the correction data manually input by the operator and the correction data provided by said second neural network.

11. An intelligent machining system for automatically determining machining conditions and for controlling a numerically controlled machine tool to machine a workpiece in accordance with the machining conditions, said intelligent machining system comprising:

attribute data storage means for storing attribute data indicating characteristics of at least one of said workpiece and machining requirements;

reference value calculating means operable in accordance with predetermined calculating expressions for calculating reference machining conditions on the basis of the attribute data stored in said attribute data storage means;

a first neural network responsive to the attribute data for correcting the reference machining conditions calculated by said reference value calculating means so as to provide the machining conditions and for outputting said machining conditions to said machine tool to machine said workpiece;

machining condition storage means for storing the machining conditions corrected by said first neural network;

error data storage means for storing machining errors relative to desired machining results;

a second neural network which receives the machining errors stored in the error data storage means and provides corrections for further correcting the machining conditions stored in the machining condition storage means;

control means for controlling the second neural network so as to receive the machining errors and to provide the corrections; and correction storage means for storing the corrections provided by the second neural network, for use in subsequently further correcting the machining conditions stored in said machining condition storage means.

12. An intelligent machining system according to claim 11, further comprising:

teaching data storage means for storing input data accumulated during the operation of said neural network, and teaching data corresponding to the input data; and learning means for performing the learning of said neural network by using the input data and the teaching data stored in the teaching data storage means.

13. An intelligent machining system according to claim 11, further comprising:

correcting means for correcting the machining conditions stored in the machining condition storage means by using the corrections provided by the second neural network.

14. An intelligent machining system for automatically determining machining conditions and for controlling a numerically controlled machine tool to machine a workpiece in accordance with the machining conditions, said intelligent machining system comprising:

attribute data storage means for storing attribute data indicating characteristics of at least one of said workpiece and machining requirements; and machining condition calculating means for calculating the machining conditions on the basis of the attribute data, said machining condition calculating means comprising:

reference value calculating means for calculating reference machining conditions on the basis of the attribute data by the use of predetermined calculating expressions; and a first neural network responsive to the attribute data and associated with said reference value calculating means so that the reference machining conditions calculated by the reference value calculating means are corrected by said first neural network so as to output the corrected machining conditions from said machining condition calculating means to said machine tool to machine said workpiece;

wherein said intelligent machining system further comprises:

sensor means for detecting at least one of instantaneous machining phenomena such as sparks, sound and force produced in machining a workpiece by the numerically controlled machine tool;

a second neural network which receives time-series data in a predetermined time interval provided by the sensor means and provides machining circumstance data in the corresponding time interval; and feed control means for controlling the feed of a tool of the numerically controlled machine tool according to the machining circumstance data provided by said second neural network.

15. An intelligent machining system according to claim 14, further comprising:

teaching data storage means for storing input data accumulated during the operation of said first neural network, and teaching data corresponding to the input data; and learning means for performing the learning of said first neural network by using the input data and the teaching data stored in the teaching data storage means.

16. An intelligent machining system for automatically determining machining conditions and for controlling a numerically controlled machine tool to machine a workpiece in accordance with the machining conditions, said intelligent machining system comprising:

attribute data storage means for storing attribute data indicating characteristics of at least one of said workpiece and machining requirements; and machining condition calculating means for calculating the machining conditions on the basis of the attribute data, said machining condition calculating means comprising:

reference value calculating means for calculating reference machining conditions on the basis of the attribute data; and a first neural network responsive to the attribute data and associated with said reference value calculating means so that the reference machining conditions calculated by the reference value calculating means are corrected by said first neural network so as to output the corrected machining conditions from said machining condition calculating means to said machine tool to machine said workpiece;

wherein said intelligent machining system further comprises:

sensor means for detecting at least one of instantaneous machining phenomena such as sparks, sound and force produced in machining a workpiece by the numerically controlled machine tool;

a second neural network which receives time-series data in a predetermined time interval provided by the sensor means and provides machining circumstance data in the corresponding time interval; and feed control means for controlling the feed of a tool of the numerically controlled machine tool according to the machining circumstance data provided by said second neural network;

wherein said feed control means has fuzzy inference means for calculating the respective adaptations of fuzzy rules by using values representing the grades of machining circumstances so as to infer a manipulated variable for controlling the controlled variable of the feed, whereby said feed control means controls the feed of the tool also in accordance with the manipulated variable.

17. An intelligent machining system according to claim 16, further comprising:

correspondence relation calculating means for determining machining conditions on the basis of the outputs of said second neural network to detect the relevant controlled variable of the feed in machining a workpiece by the manual operation of the numerically controlled machine tool by a skilled operator; and fuzzy rule producing means for producing fuzzy rules on the basis of the relation between the machining conditions determined by the correspondence relation calculating means and the controlled variable of the feed.

18. An intelligent machining system according to claim 16, further comprising learning means for determining corrections for correcting the machining conditions on the basis of the mean value of manipulated variables provided in a predetermined time interval by said fuzzy inference means, and for performing the learning of said first neural network, which receives the attribute data, on the basis of the corrections.

19. An intelligent machining system for automatically determining machining conditions and for controlling a numerically controlled machine tool to machine a workpiece in accordance with the machining conditions, said intelligent machining system comprising:

attribute data storage means for storing attribute data indicating characteristics of at least one of said workpiece and machining requirements; and machining condition calculating means for calculating the machining conditions on the basis of the attribute data, said machining condition calculating means comprising:

reference value calculating means for calculating reference machining conditions on the basis of the attribute data; and a first neural network responsive to the attribute data and associated with said reference value calculating means so that the reference machining conditions calculated by the reference value calculating means are corrected by said first neural network so as to output the corrected machining conditions from said machining condition calculating means to said machine tool to machine said workpiece;

wherein said intelligent machining system further comprises:

sensor means for detecting at least one of instantaneous machining phenomena such as sparks, sound and force produced in machining a workpiece by the numerically controlled machine tool;

a second neural network which receives time-series data in a predetermined time interval provided by the sensor means and provides machining circumstance data in the corresponding time interval; and feed control means for controlling the feed of a tool of the numerically controlled machine tool according to the machining circumstance data provided by said second neural network; and wherein said feed control means has fuzzy inference means for calculating the adaptations of fuzzy rules by using values representing the grades of machining circumstances, so as to infer a manipulated variable for controlling the controlled variable of the feed, whereby said feed control means controls the feed of the tool also in accordance with the manipulated variable.

20. An intelligent machining system for automatically determining machining conditions and for controlling a numerically controlled machine tool to machine a workpiece in accordance with the machining conditions, said intelligent machining system comprising:

attribute data storage means for storing attribute data;

automatic machining condition determining means including a first neural network and capable of automatically determining machining conditions on the basis of the attribute data stored in the attribute data storage means;

correcting means for correcting the machining conditions determined by the automatic machining condition determining means, according to instructions given thereto by an operator to provide corrected machining conditions;

machining control means for controlling the machining operation of the numerically controlled machine tool according to the machining conditions or the corrected machining conditions;

diagnostic means including a second neural network, which receives machining errors corresponding to deviations of machined results from desired machined results and provides corrections for correcting the machining conditions, and capable of correcting the machining conditions by using the corrections to determine corrected machining conditions;

learning means for performing the learning of the first neural network for determining machining conditions according to the corrected machining conditions determined by at least one of the correcting means and the diagnostic means so that the corrected machining conditions are provided for the same input attribute data as that initially applied to the automatic machining condition determining means;

sensor means for detecting at least one of instantaneous machining phenomena such as sparks, sound and force produced in machining the workpiece; and adaptive control means for dynamically correcting the machining conditions by receiving time-series data provided by said sensor means by a third neural network, and by recognizing average machining circumstances in a time interval on the basis of the output of the third neural network.

* * * * *